INVENTORS
J. G. PEARCE
W. W. PHARIS
G. F. NEUMEIER
BY Dicke & Craig
ATTORNEYS

ADD-ON CONFERENCE TRUNK

Feb. 24, 1970 J. G. PEARCE ET AL 3,497,631

ADD-ON CONFERENCE TRUNK

Filed Aug. 5, 1966 17 Sheets-Sheet 8

ADD-ON CONFERENCE TRUNK

Filed Aug. 5, 1966 17 Sheets-Sheet 12

3,497,631
ADD-ON CONFERENCE TRUNK

James G. Pearce, William W. Pharis, and Guenther F. Neumeier, Rochester, N.Y., assignors to Stromberg-Carlson Corporation, Rochester, N.Y., a corporation of Delaware Filed Aug. 5, 1966, Ser. No. 570,536
Int. Cl. H04m 3/56
U.S. Cl. 179—18 15 Claims

ABSTRACT OF THE DISCLOSURE

An add-on conference control circuit responsive to a flashing signal detected in a line connection between calling and called subscribers for automatically connecting one of these subscribers to supervisory equipment while holding the other subscriber so that the one subscriber may dial a third party to establish a conference call, the conference control circuit including means for release thereof upon release by the third party or for holding connection to the supervisory equipment if only one of the original calling and called subscribers releases.

The present invention relates in general to telephone systems, and more particularly to a conference circuit control arrangement for use in combination with a fully automatic electronic common control telephone communication system effecting complete and automatic connection of a transmission circuit between original and terminating subscribers with a third party line circuit in response to command from one of the parties of the original subscriber transmission circuit.

Previous efforts in the design of common control systems have been plagued by the high cost of access equipment for associating common equipment with transmission circuits. This access equipment has taken the form of special networks, sometimes referred to as service link networks, through which association is made between the various common circuits necessary for setting up and monitoring a call and the transmission circuits. In these arrangements, separate junctors are provided for originating and terminating purposes with the line link network, being used first for association with the common circuits and then for association with the transmission circuits. In providing separate junctors for both originating and terminating purposes, the cost of the access equipment is greatly increased and the control complexity and increased storage necessary for such a system renders such a scheme highly impractical, especially for small telephone systems with small memory capabilities.

In contrast, a common control system, such as described in U.S. application Ser. No. 552,283, filed by James Gordon Pearce et al. on May 23, 1966, entitled "Universal Junctor," provides a single programmed control circuit for use with electronic telephone systems in lieu of the multiple originating and terminating junctors utilized in prior systems for associating common equipment with the transmission circuits. This common control circuit may also, for example, be associated with a register sender system, such as disclosed in application Ser. No. 300,557 of James G. Pearce et al. filed Aug. 7, 1963, wherein a single all electronic system is provided for storing information regarding the called and calling subscribers, such as routing digits for the called parties and class of service for the called and calling parties, and for making this information available for purposes of processing a call in a fully automatic manner.

The present invention provides for an add-on conference circuit arrangement for use in conjunction with common control circuits such as disclosed in connection with the above-referred universal junctor circuit. The conference circuit of the present invention is provided as time shared equipment in a common control system and is capable of establishing a circuit connection betwen one of two originating subscribers and a third party line circuit to provide a conference circuit connection while holding the second one of the originating subscribers until the conference circuit is complete. At this point connection between all three or any two of the subscribers is automatically effected.

The conference circuit of the present invention consists in part of a transmission bridge circuit which is acquired automatically upon receipt of a flashing indication from a subscriber in a completed transmission connection having the add-one conference feature, and connection is made between the original transmission circuit under control of its supervisory control system and an additional time slot in, or completely different, common control system for establishing a connection to the third party line circuit. Dialed impulses representing the third party line circuit are transmitted from one of the originating subscribers through the conference bridge circuit to the conference circuit control system where the connection to the third party is processed in the same manner as an originating call.

An additional portion of the conference circuit of the present invention includes an electronic interface and junctor address store which serves to provide release features where in a three way connection may be established between the subscribers and subsequent thereto release of any subscriber will not release connection between the remaining two.

It is an object of the instant invention to provide a novel conference circuit arrangement for use in connection with an automatic common control telephone communication system.

It is another object of the instant invention to provide a conference circuit arrangement which is fully automatic in connection with establishing and terminating a third party call.

It is a further object of the instant invention to provide a novel conference circuit arrangement capable of association on a time share basis with the various common circuits in an automatic electronic telephone system needed for establishing a call.

These and other objects, features and adavntages of the instant invention will become more apparent from the following detailed description when taken in conjunction with the accompanying drawings, which disclose one embodiment of the invention and wherein.

Figure 3A:
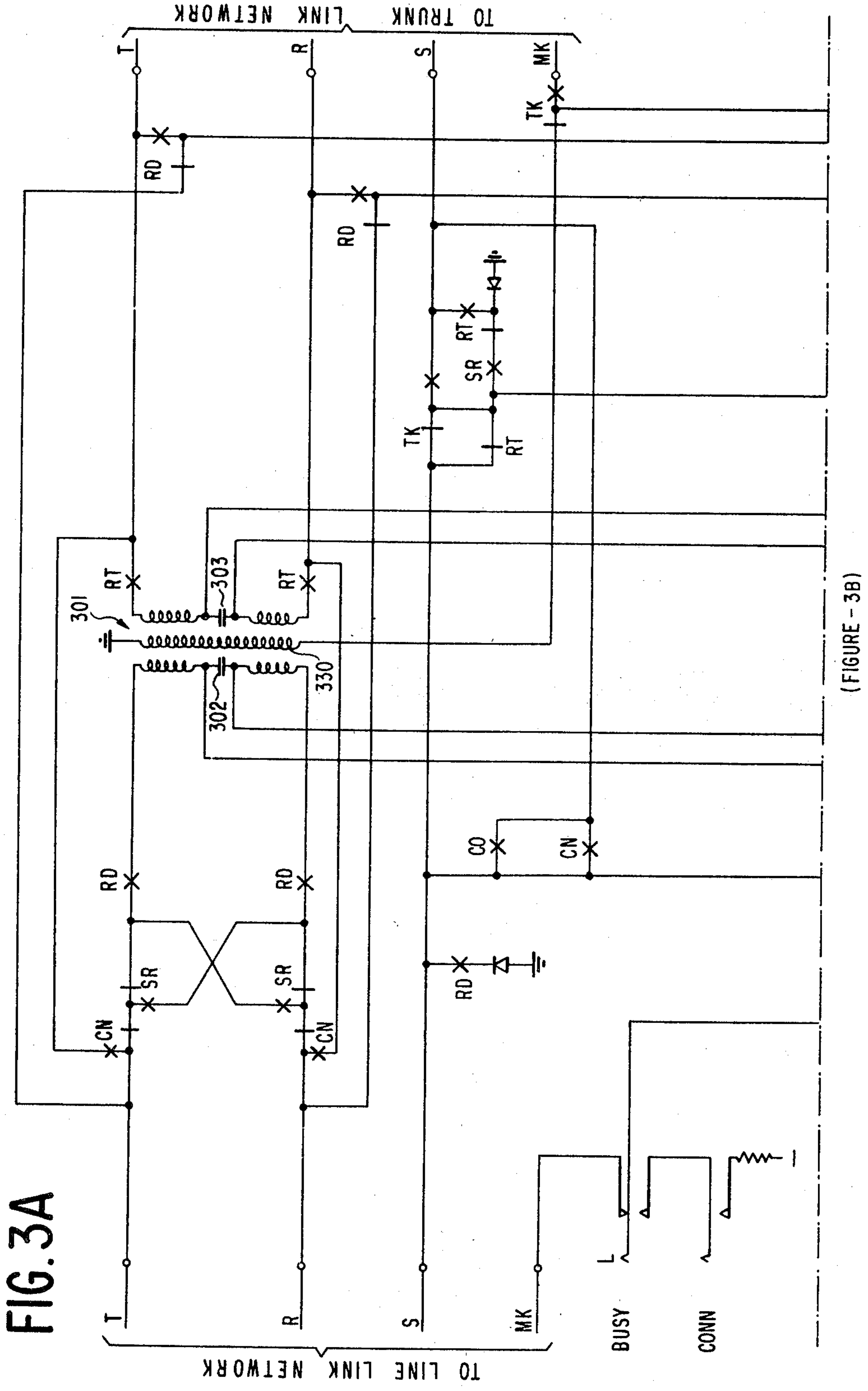
Figure 3B:
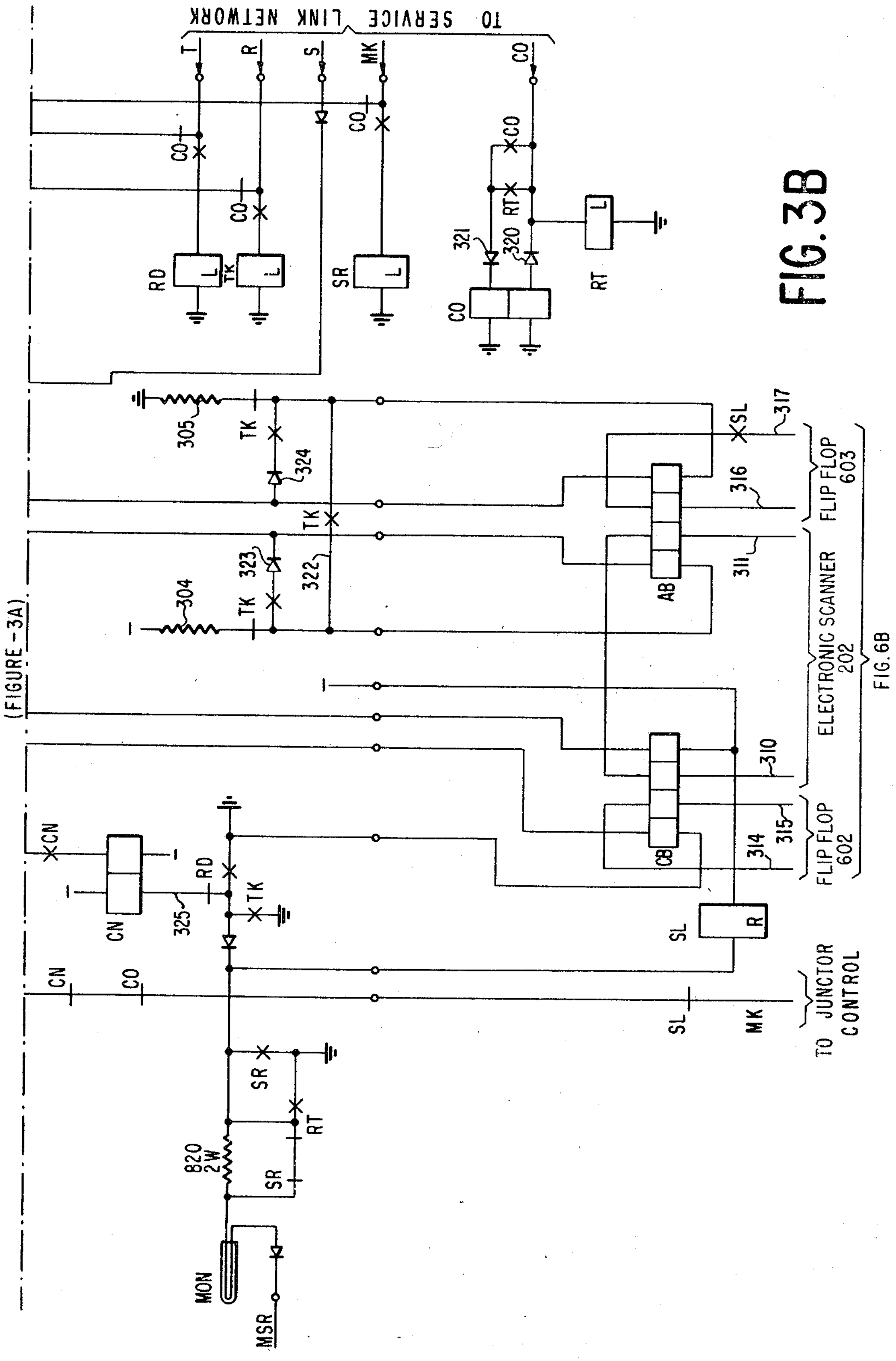
Figure 4:
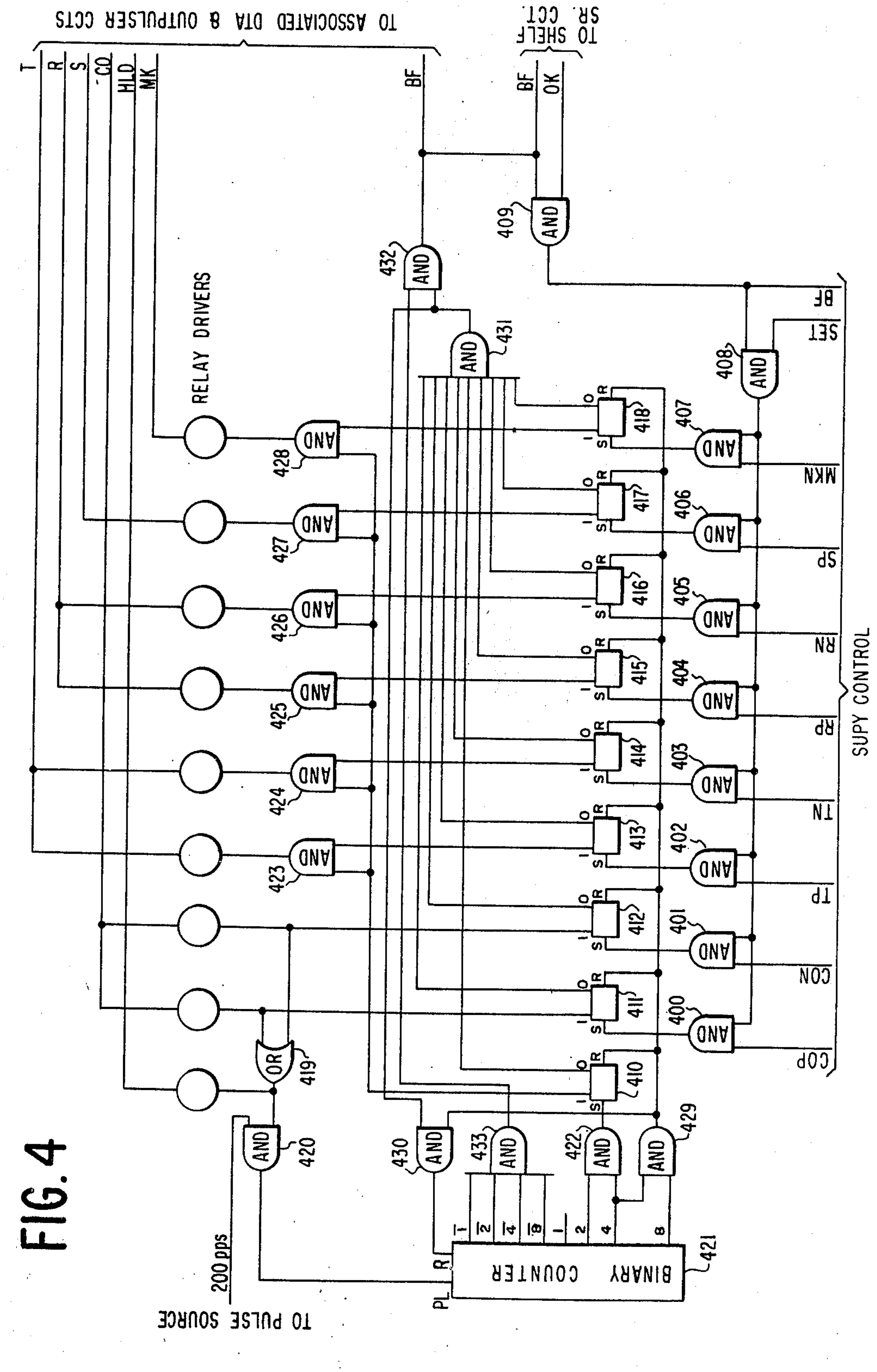
Figure 5A:
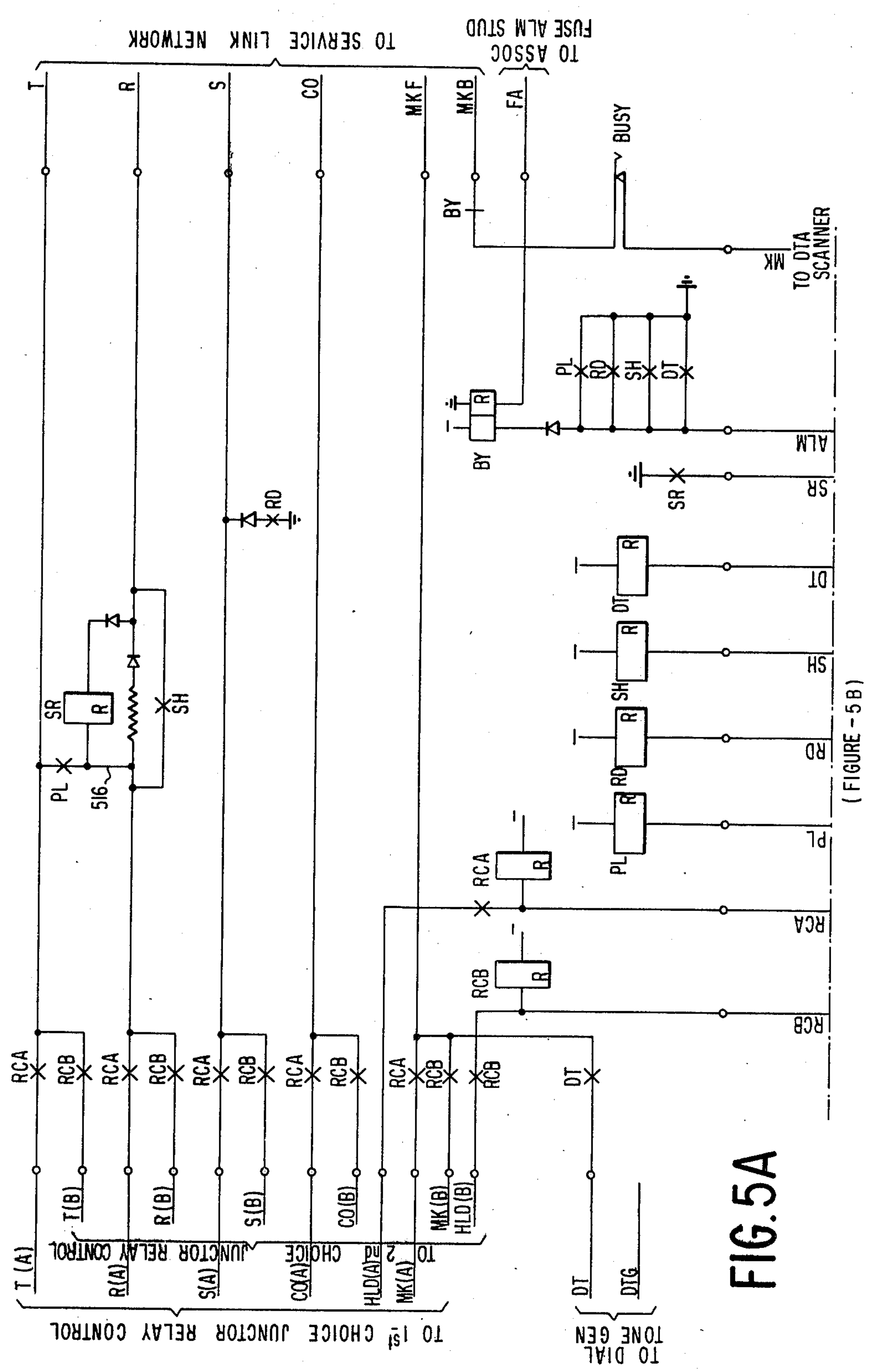
Figure 5B:
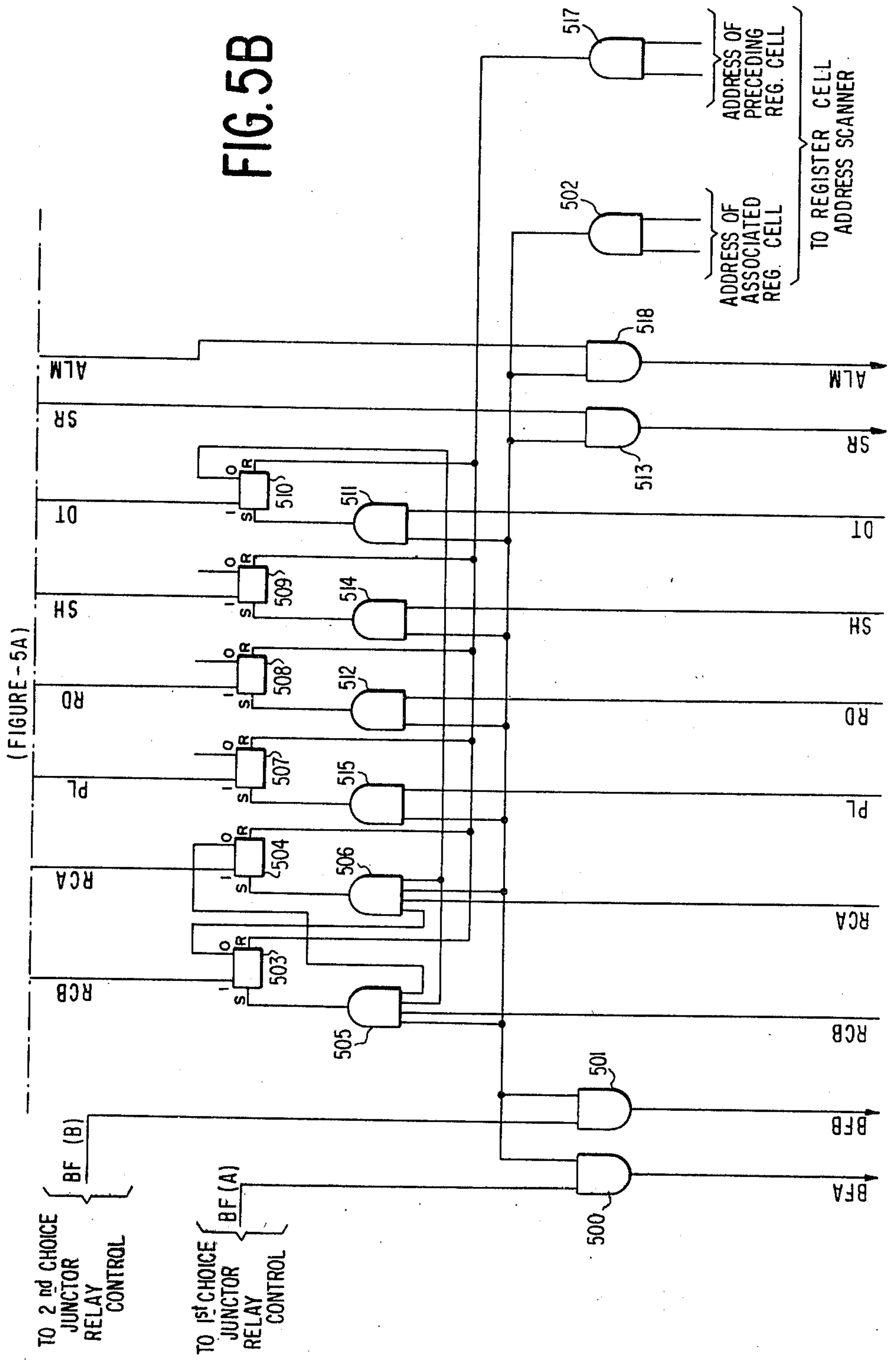
Figure 6A:
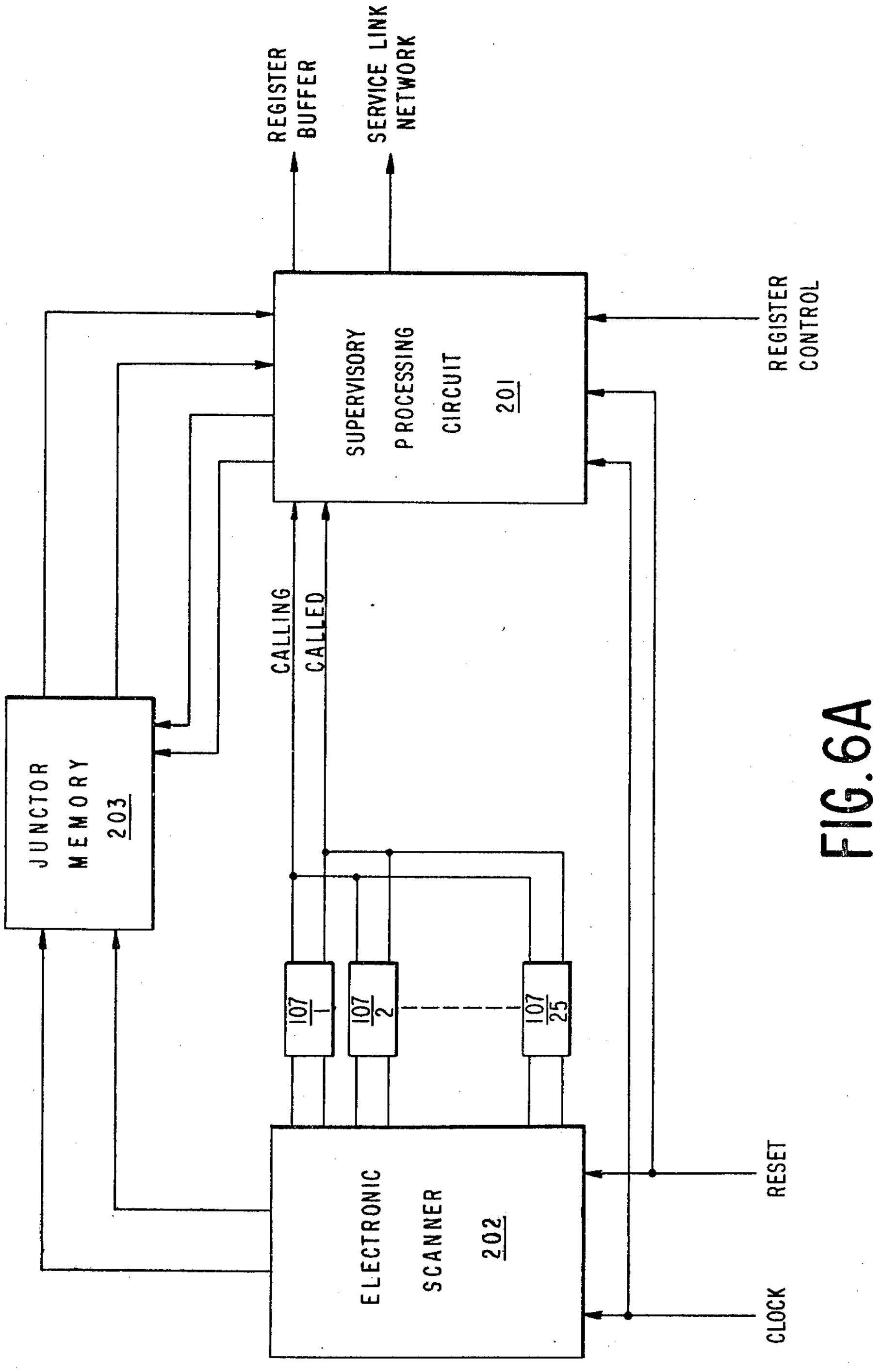
Figure 6B:
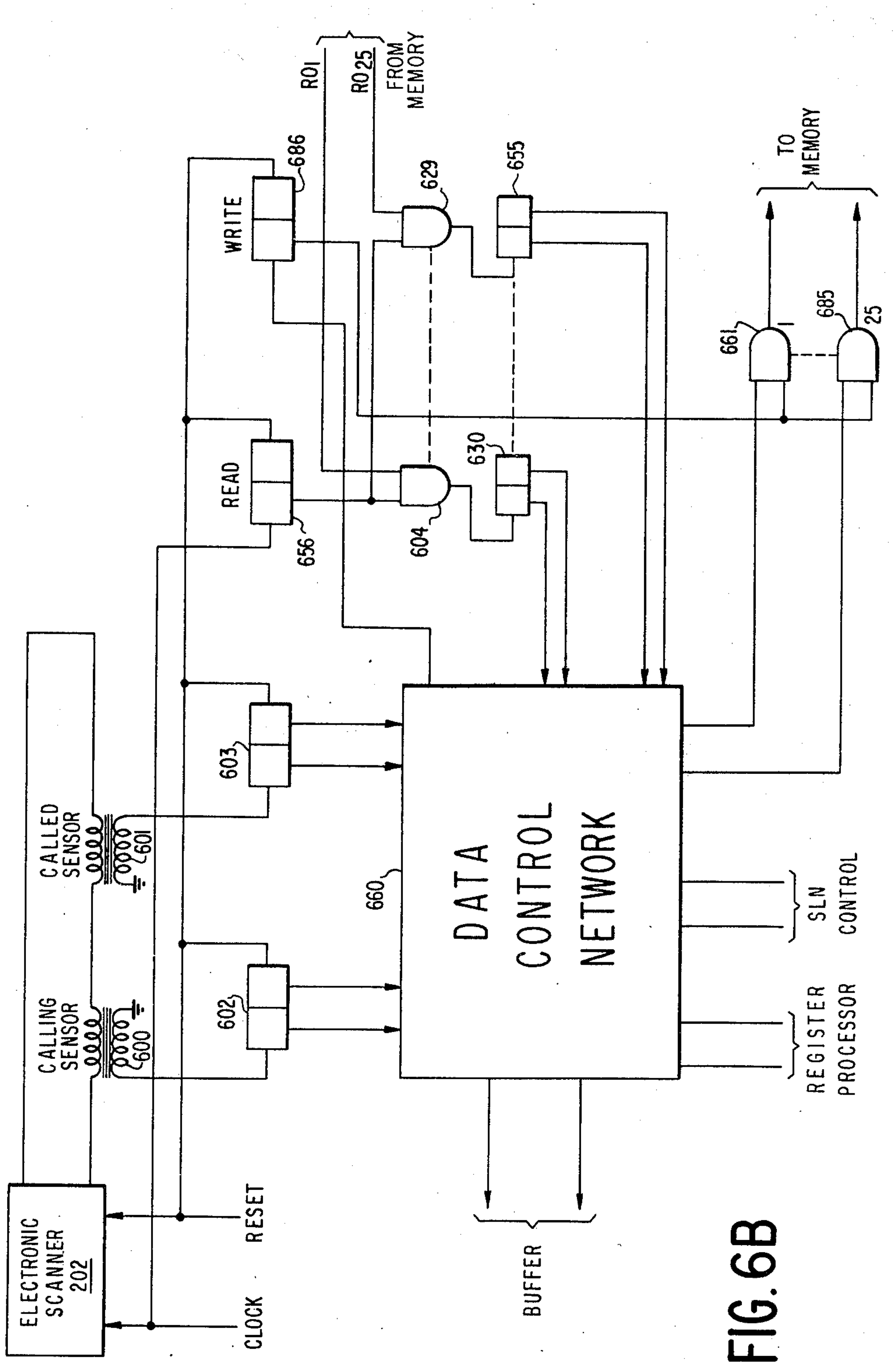
Figure 7A:
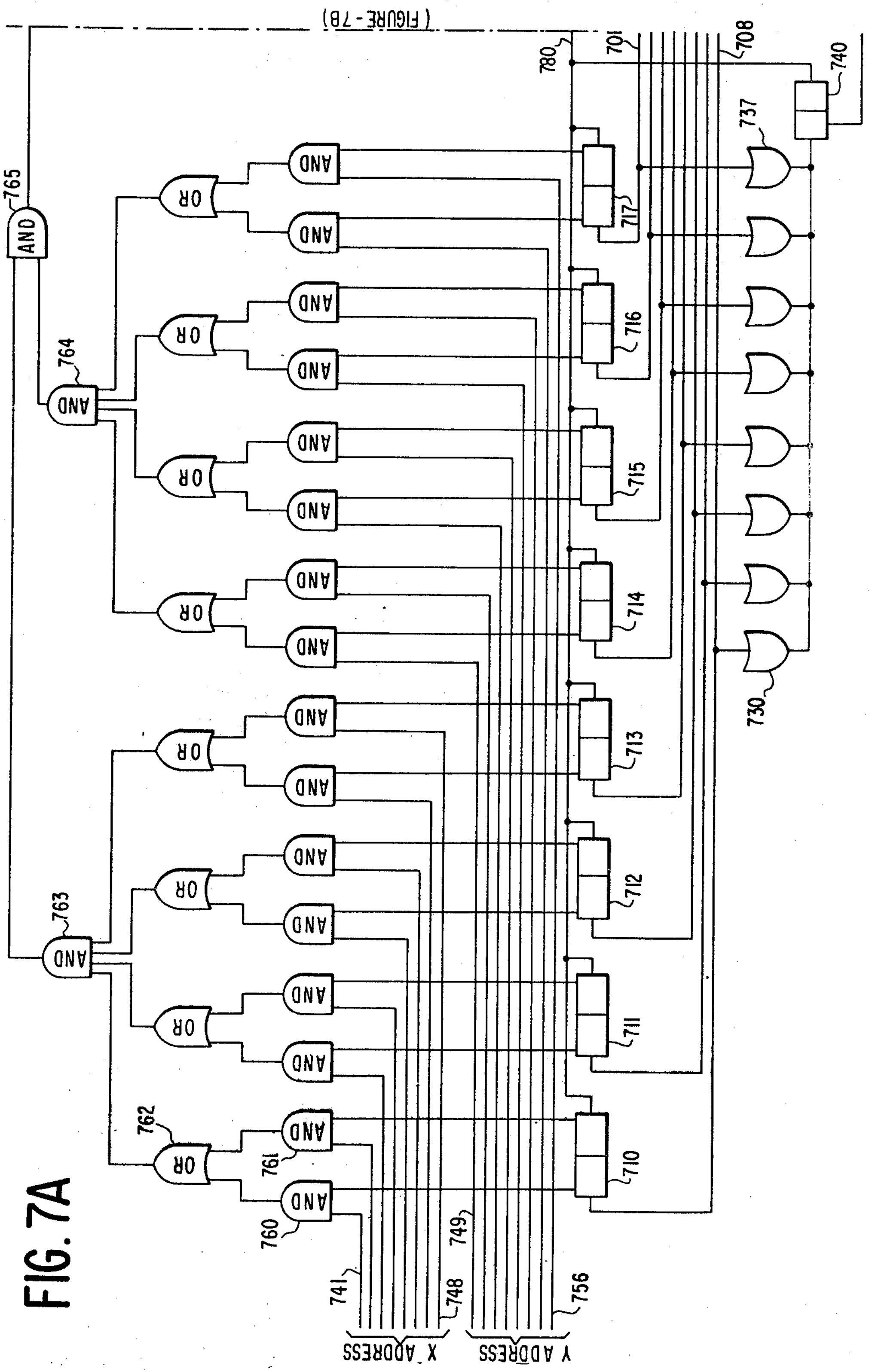
Figure 7B:
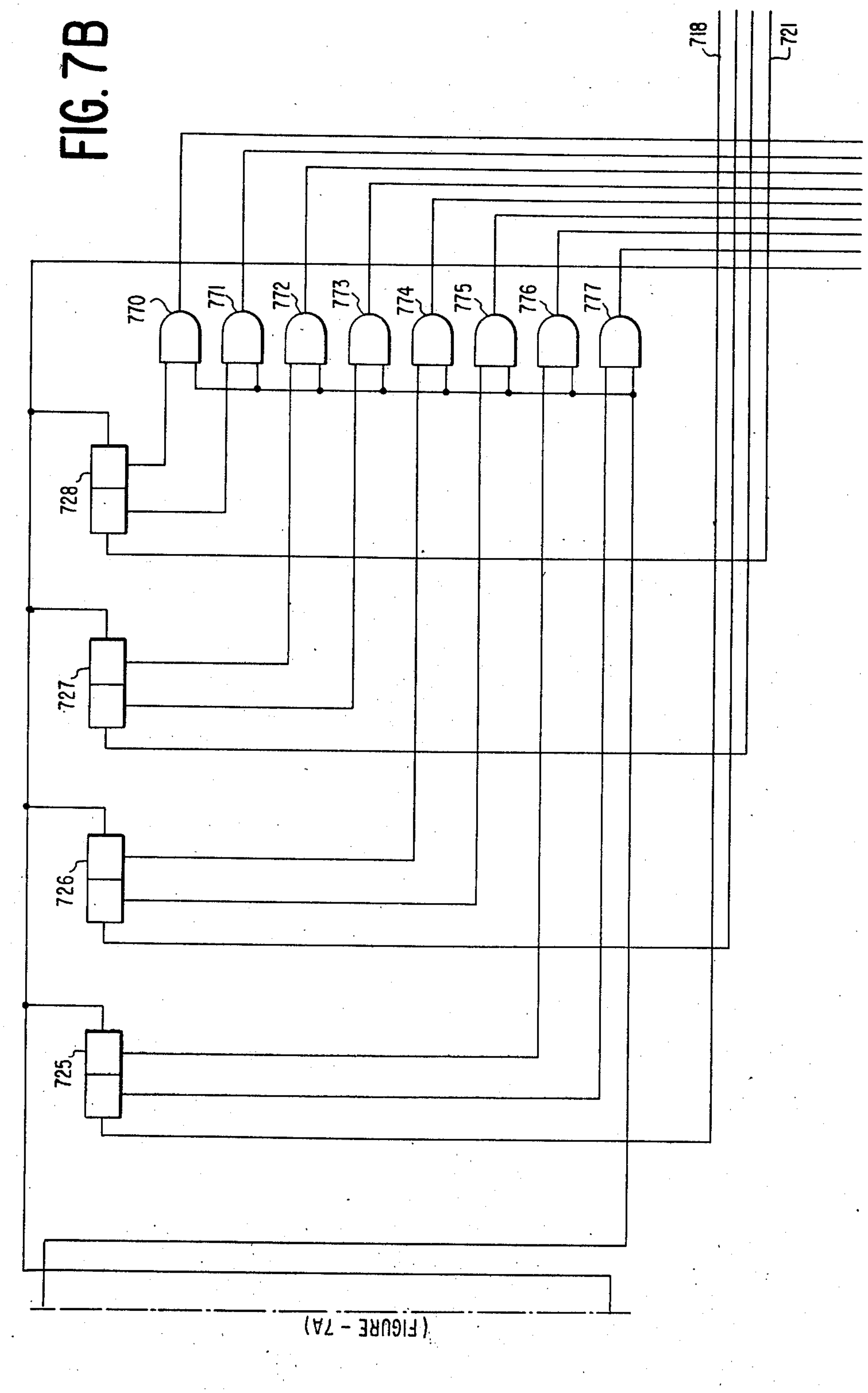
Figure 8:
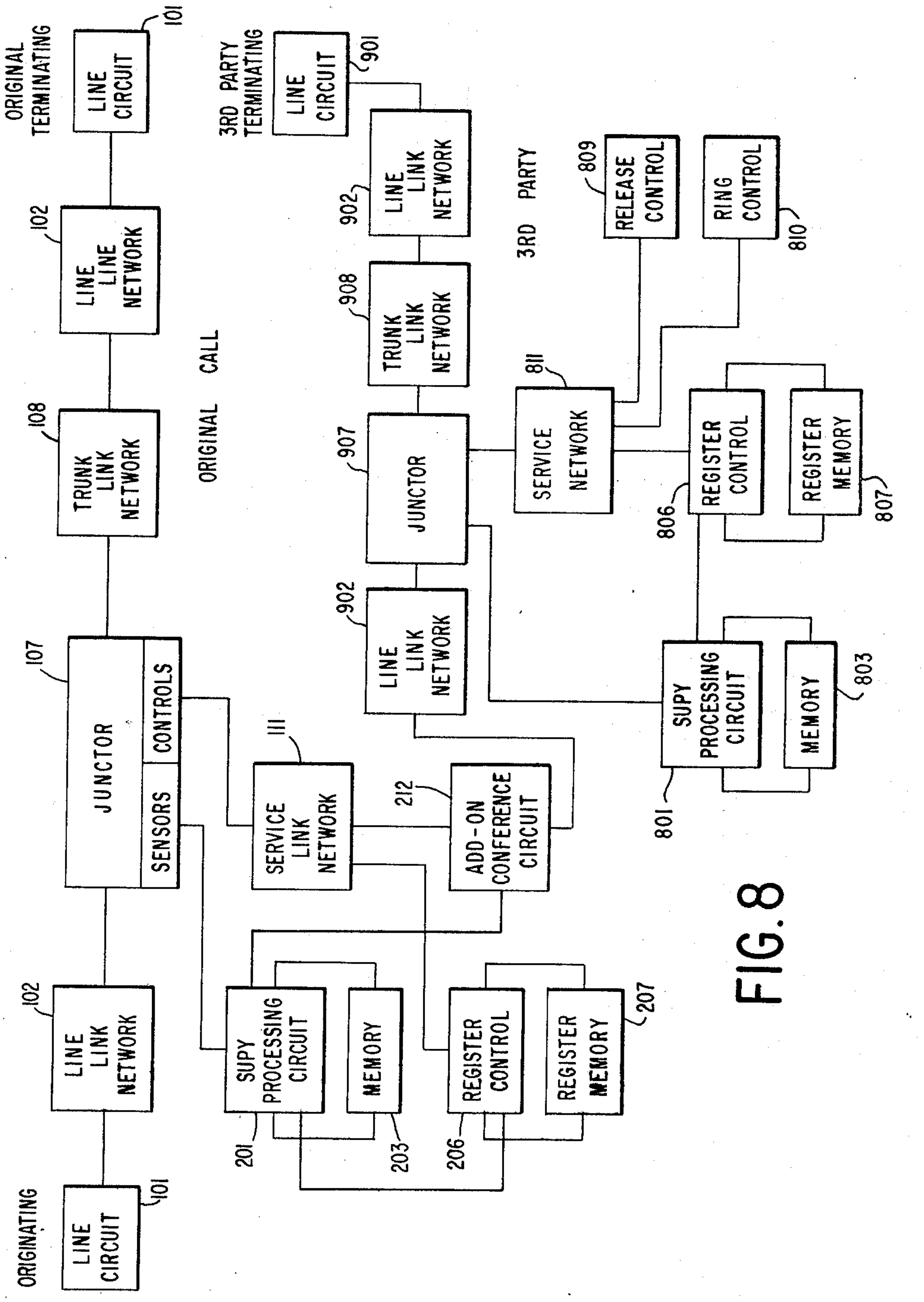
Figure 9:
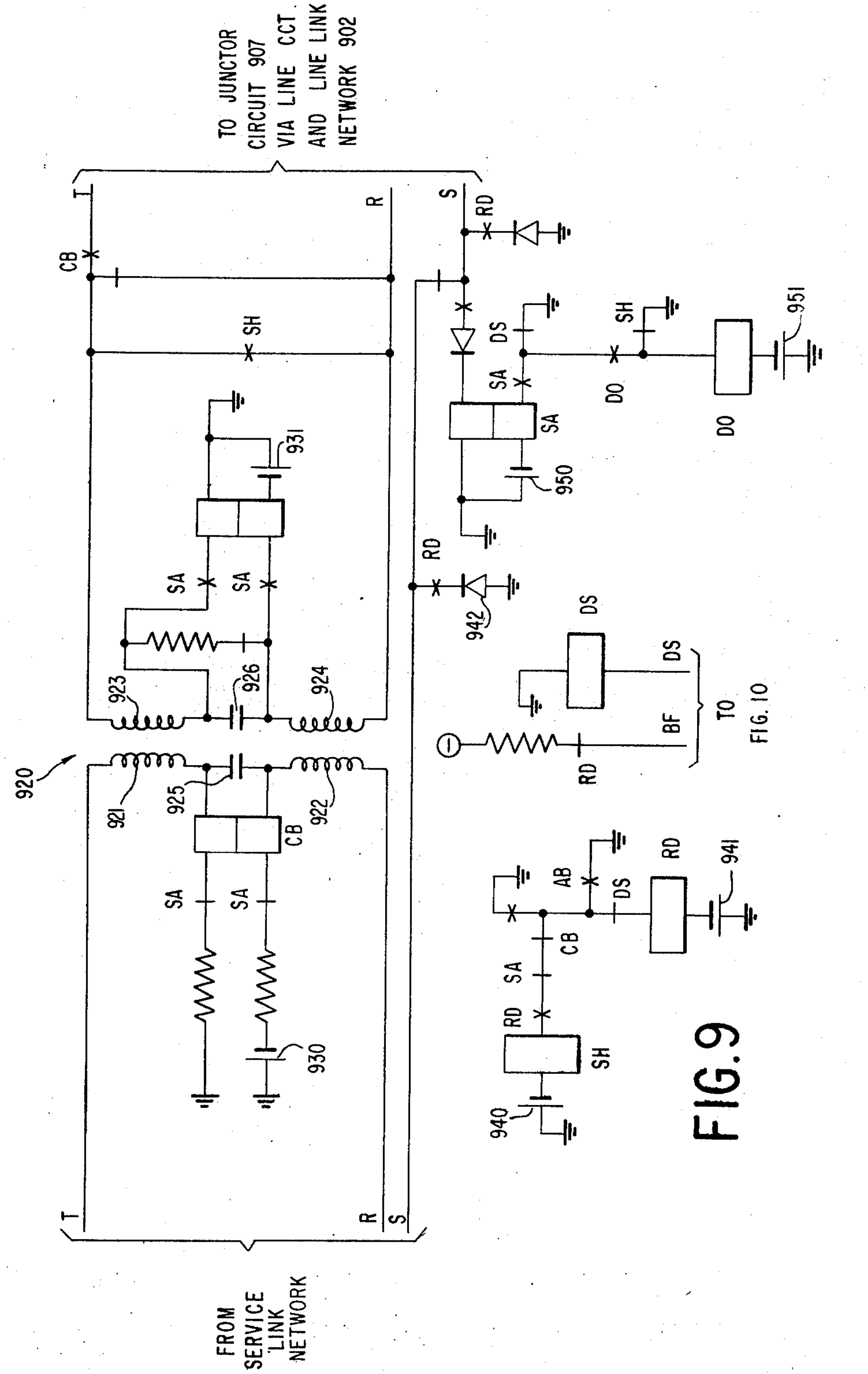
Figure 10:
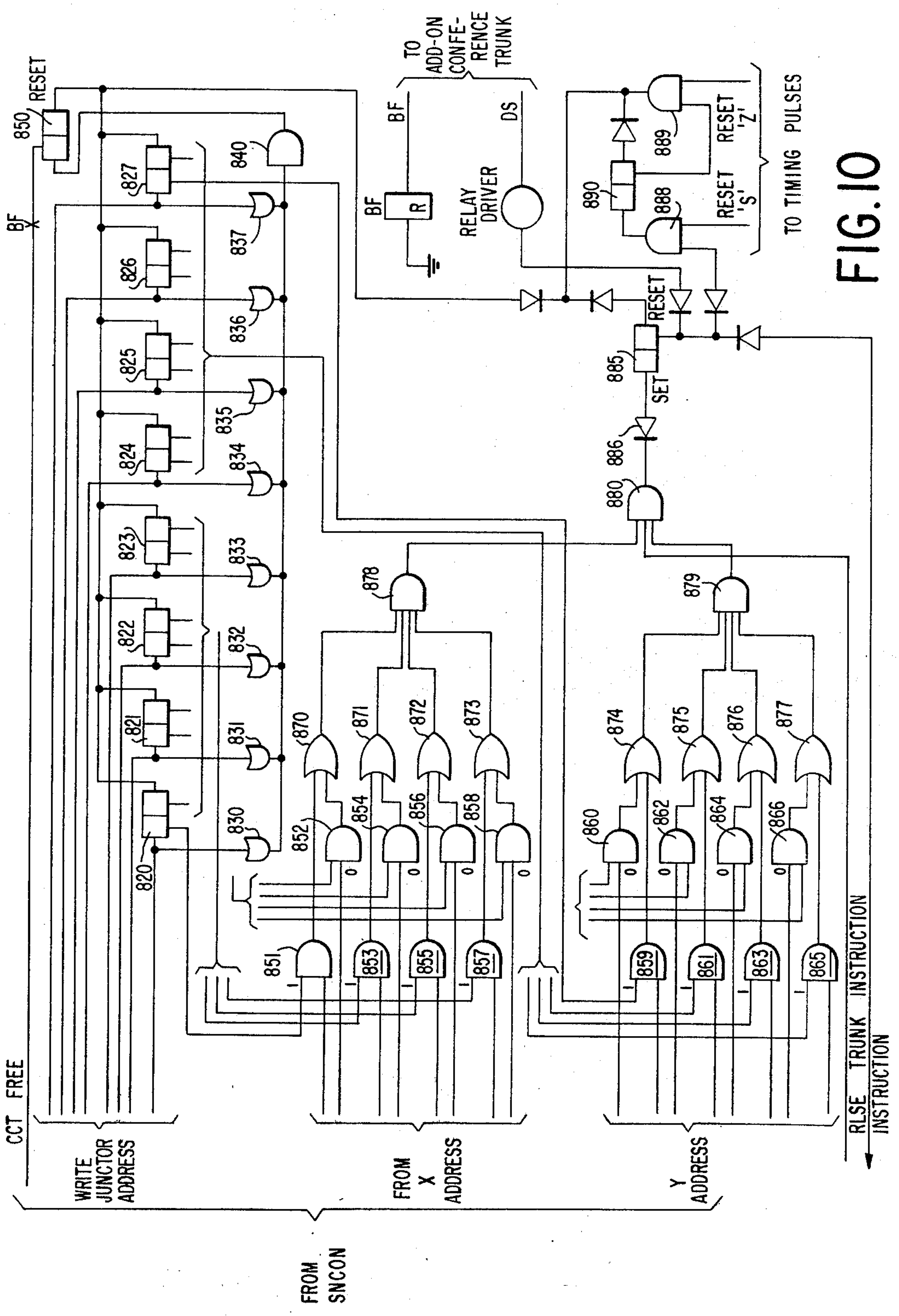
Figure 11:
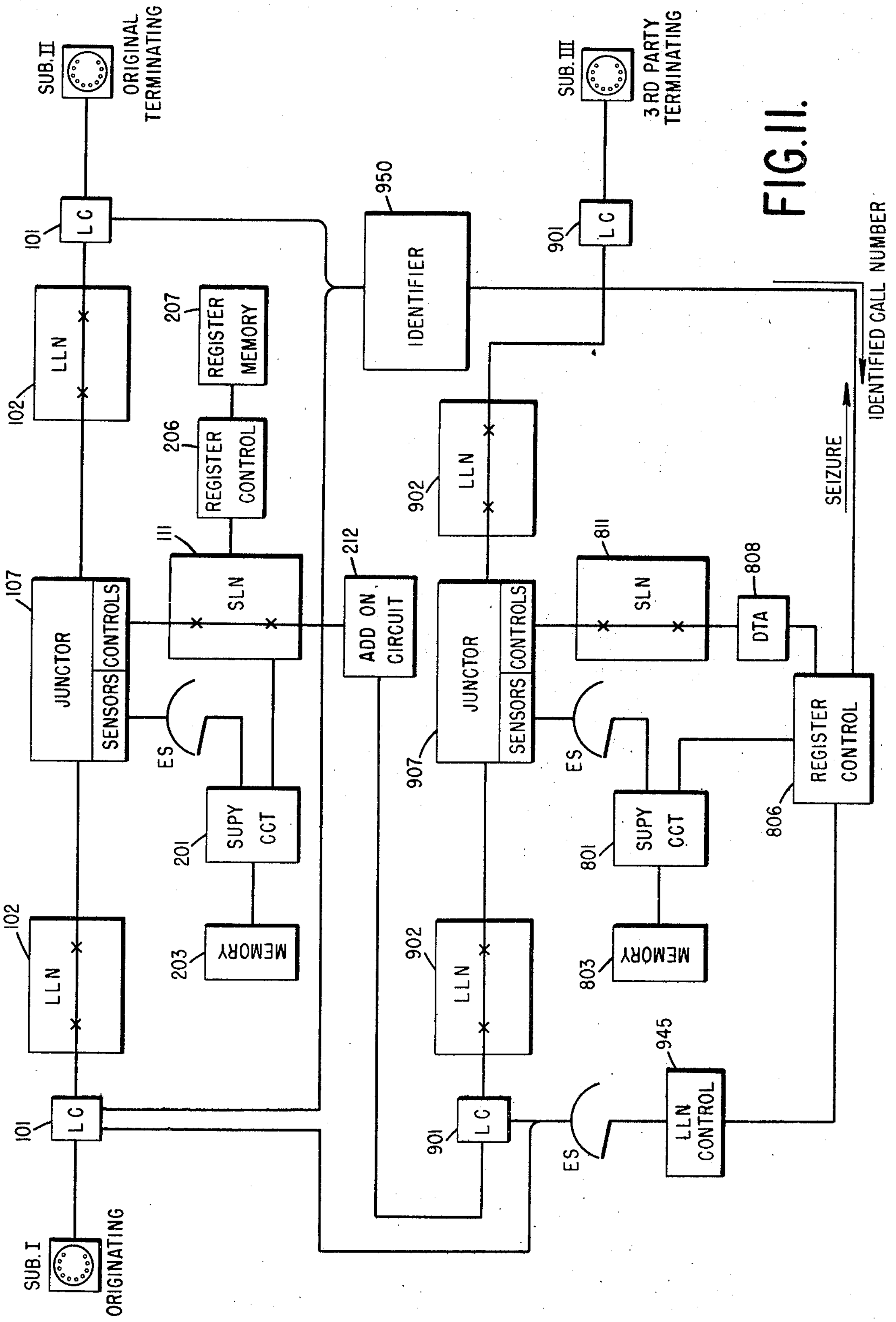

FIGURES 3A and 3B provide a circuit diagram of the junctor in accordance with the invention;

FIGURE 4 is a schematic diagram of the junctor control circuit in accordance with the invention;

FIGURES 5A and 5B are schematic diagrams of the dial tone applicator and outpulser circuit;

FIGURE 6A is a general block diagram of the interrelationship between the plural junctors, junctor memory, scanner, and supervisory processing circuit;

FIGURE 6B is a schematic diagram of the supervisory processing circuit;

FIGURES 7A and 7B are schematic diagrams of the junctor release control in accordance with the invention;

FIGURE 8 provides a general block diagram of the conference circuit of the present invention;

FIGURE 9 is a schematic diagram of the conference bridge circuit which forms part of the invention;

FIGURE 10 is a schematic diagram of the electronic interface and junctor address store of the invention; and FIGURE 11 is a block diagram of a second embodiment of the invention.

While the invention is disclosed in connection with the Junctor Circuit of the aforementioned application of James Gordon Pearce et al., it will be apparent from the following detailed description of the invention that the same may be used to advantage in conjunction with other systems and may be associated with these systems in accordance with the teachings set forth herein.

Figure 1A:
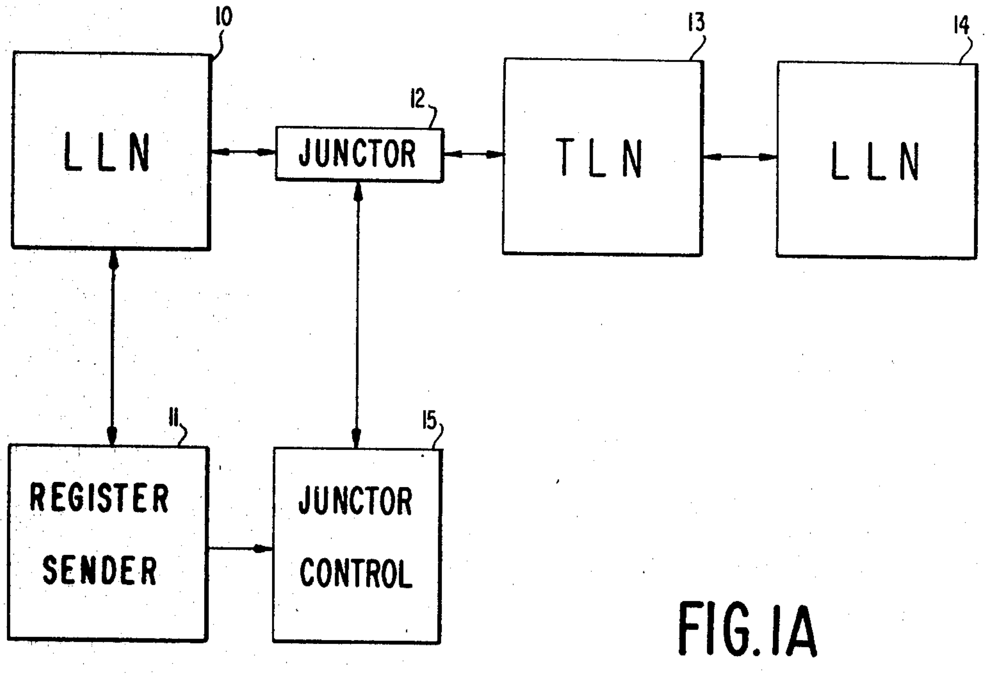
FIGURE 1A is a general block diagram of a telephone system utilizing the instant invention.

Referring first to FIGURE 1A, there is illustrated a basic block diagram of a telephone system comprising a line link network 10 including a plurality of line circuits, a trunk link network 13 and either the same or a distance line link network 14 connected to the trunk link network. A register sender 11, such as disclosed in the aforementioned application Ser. No. 300,557 of James Gordon Pearce et al., for example, may be connected to the line link network 10 for acting during the initial stages of establishment of a call from a calling subscriber to provide proper routing information in response to dialed digits received through a universal junctor circuit 12 and a junctor control circuit 15, such as disclosed in the aforementioned application Ser. No. 300,557 of James Gordon Pearce et al., and to mark the calling and called line circuits, so that in cooperation with the junctor normal control 15 and universal junctor 12 a connection may be made therebetween.

Figure 1B:
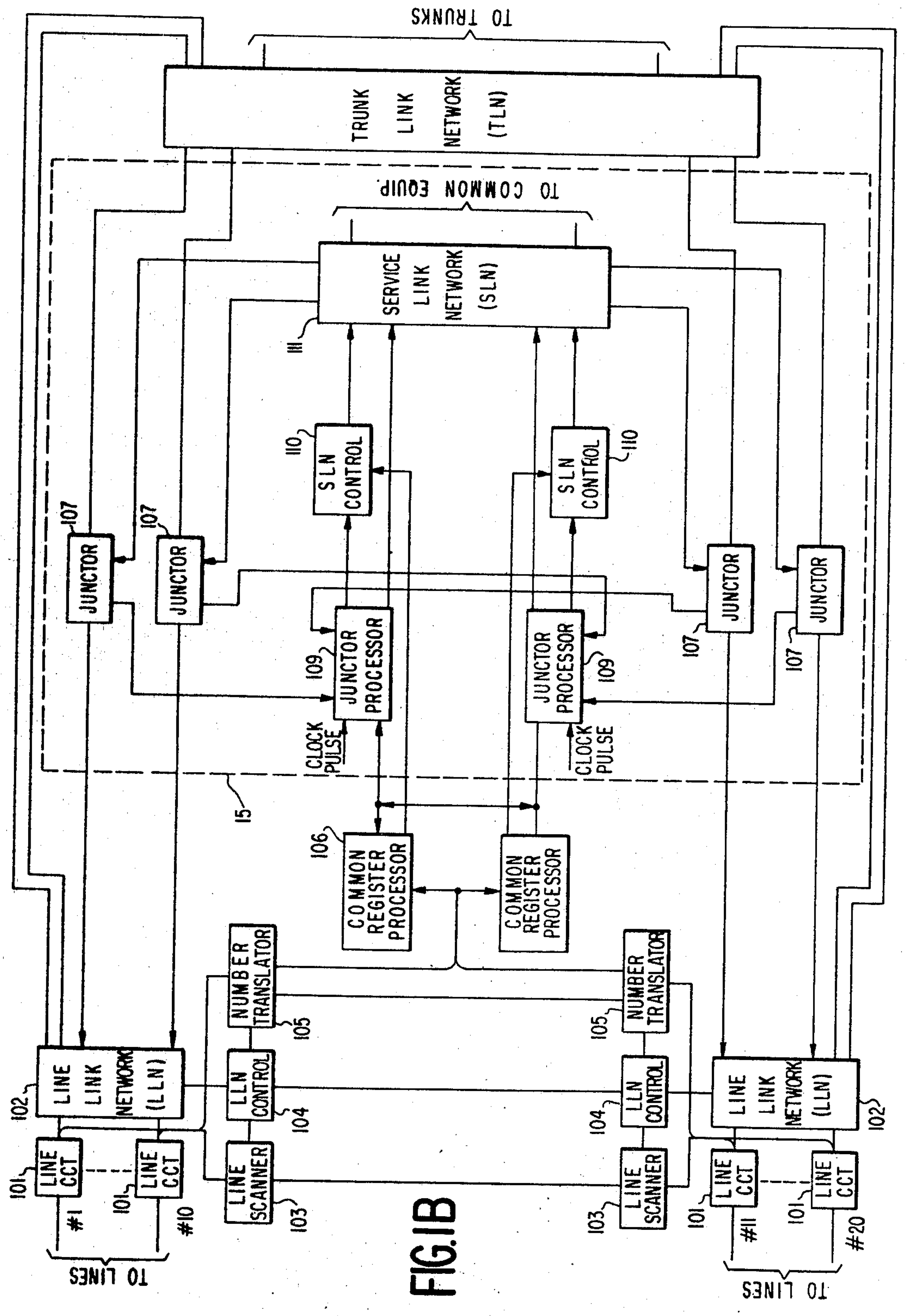
FIGURE 1B is a more detailed block diagram of the system of FIGURE 1A.

FIGURE 1B illustrates in somewhat greater detail an over-all schematic block diagram of the system of FIGURE 1A. A plurality of line circuits 101 are connected in groups of ten to line link networks (LLN) 102 of which there are two provided in the illustrated embodiment for purposes of showing how a plurality of lines may be controlled. A line scanner 103 is provided for each line link network 102 and is connected to each line circuit 101 associated therewith. The line scanner 103 is in turn connected to a line link network control 104 which, upon receipt of information from the line scanner as to an open line circuit condition, locates the open line and marks it via the line link network 102.

The line link network control 103 is connected to a number translator 105 which is also connected to the line scanner 103 and serves to provide information regarding the directory number of the line which is calling and of the required routing and class of service information. Connected to the number translator 105 is a common register processor 106, which in accordance with its internal program memory controls the line link network control 104 to mark the calling line upon receipt of necessary information from the number translator 105 translated from the dialed information from the calling subscriber. The system described to this point is similar to the register sender system described in the aforementioned application Ser. No. 300,557 of James Gordon Pearce et al.

A plurality of universal junctor circuits 107 which connect the line link network 102 through a trunk link network 108 back to the line link network 102 or to outgoing trunk circuits as required are associated with junctor processor circuits 109 on a time division multiplex basis, the junctors associated with each junctor processor circuit being scanned repeatedly every ten milliseconds by the junctor processor to monitor the condition of the line circuits to which the individual junctors are connected. The junctor processor 109 detects the condition of the line circuit to which the individual junctor 107 is connected, returns dial tone to the calling party in response to control by the common register processor 106, detects dialed impulses via the line link network 102 and junctor 107, applies the dialed digits and other information regarding the condition of the line circuit to the common register processor 106, applies ringing and ring back to the called and calling parties in response to control from the common register processor 106 and controls the relays in the junctor 107 via a service link network control 110 and service link network 111 to provide connection between the various common circuits through the junctor to the calling and called line circuits. The junctor processor 109 also continuously monitors the transmission circuits to which the junctors 107 associated therewith are connected to provide supervisory control and response to service requests by either the calling or called parties.

Figure 2A:
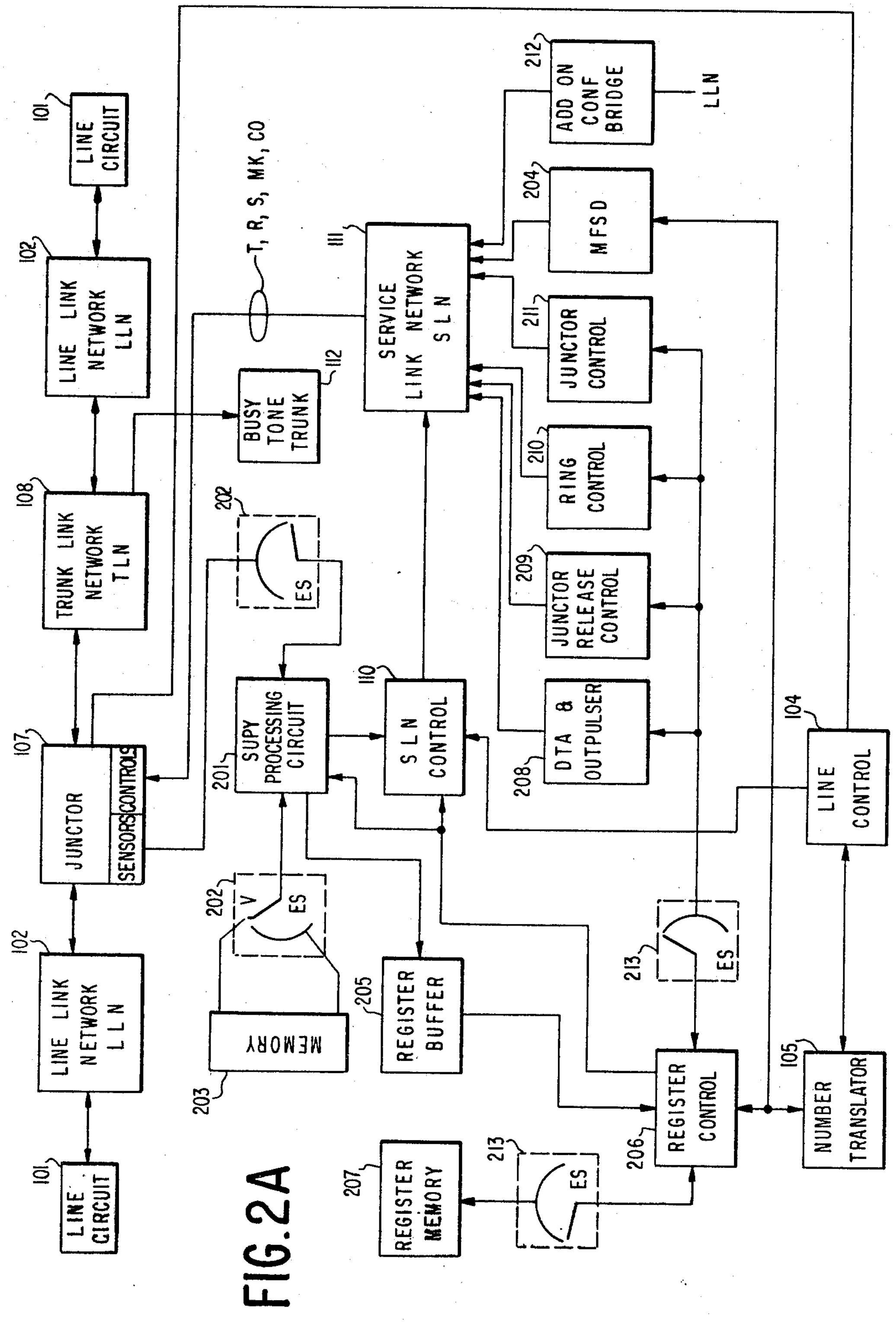
FIGURE 2A is a block diagram illustrating the components of the invention and therein association with the other elements of the system.

A general block diagram of the junctor processor 109, together with a single junctor 107 to which it is periodically connected, the service link network 111 and service link network control 110 are illustrated in FIGURE 2A. The junctor circuit 107 provides an interface between the line link network 102, the trunk link network 108 and the service network which includes the service link network 111, the service link network control 110, the junctor processor 109 and the common register processor 106 in the register sender. This junctor serves both as an originating and terminating junctor, and is arranged so that it has no inherent decision-making circuitry and therefore is a slave to a processing control which obtains access to the calling and called lines via the sensors in the junctor itself.

Each junctor 107 is connected to a junctor processing circuit, previously designated 109 and now called the supervisory processing circuit 201, on a time share basis by an electronic scanner 202 which simultaneously connects a junctor memory 203 to the supervisory processing circuit with the interconnection between the circuit elements being effected at the time when a segment of the memory 203 allocated to the particular junctor is available. This supervisory processing circuit 201 determines the condition of the line circuit by way of the sensors in the junctor 107 and compares this condition during each scan with the previous condition of the line circuit as stored in the junctor memory 203. Each of the junctors is scanned once every ten milliseconds so that a dialing impulse of 20 millisecond duration will be detected at least twice, thereby determining that it is a dialing impulse rather than a spurious signal such as an intermittent contact or other meaningless indication.

Figure 2B:
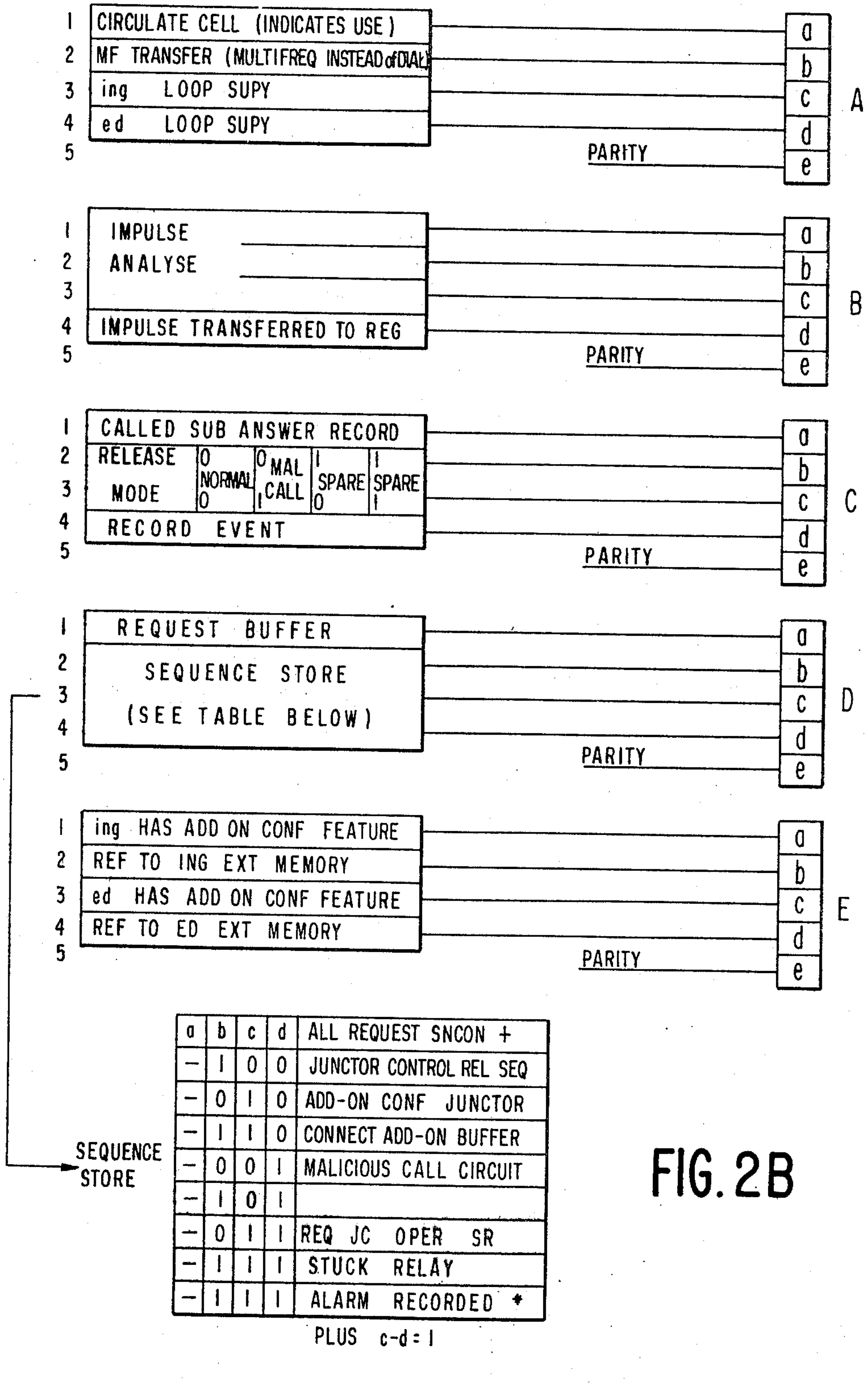
FIGURE 2B is a table indicating the allocation of the various information bits to particular subject matter.

The memory 203 will contain a segment for each junctor which is periodically connected to the associated supervisory processing circuit 201. In other words, there will be as many segments in the memory 203 as there are junctors 107 associated with a given supervisory processing circuit 201. The memory 203 may be either recirculating or random access and each segment of the memory typically contains 25 bits of information or instruction as shown in FIGURE 2B although it should be understood that any convenient number of bits can in fact be used. The 25 bits of the memory are divided into five bit characters, of which the fifth or last bit of each character is provided as a parity or checking bit. The bit characters provide for a grouping of the bits into semi-related functions such as monitoring of the line circuits, timing functions, and various instructions utilized for control of the service network. The bits which make up each character within each segment of the memory are schematically disclosed in FIGURE 2B. These characters may be regarded as subregisters for retaining binary bits which are continually being altered and which are a function of data derived from the particular junctor associated with that segment of the memory and data derived from the common register processor.

The first character A of FIGURE 2B of each segment is used to indicate that the segment is in use. A bit in position 1 in character A indicates that the segment is in use and permits the writing or manipulation of information in the other characters in the memory segment. If no such bit occurs in the first position, then information available to the memory is not recorded and no action is taken on such information. A bit in position 2 of the first character A indicates that transfer is multi-frequency instead of dial, as for instance, if the call is originating from a tone dial telephone. In a case of a bit in this second position, the supervisory processing circuit connects through the service link network control in the service link network to a multi-frequency signal detector 204 transferring the multi-frequency signals to this circuit element for translation and direct application to register control 206. Bits in positions 3 and 4 of character A of the memory segment indicate the state of the calling and called loops, respectively, a bit indicating an open line condition and a zero indicating a closed line condition. The fifth position of character A as in the other characters of the memory segment is reserved for the parity or checking bit.

The second character B of the memory segment is used for impulse analyzing and controls the analysis of the durations of time for which the calling or called line is open or closed. Positions 1, 2 and 3 of character B provide for a three bit binary counting sequence. These three bits are used to keep a record of the length of time for which the calling loop is either open or closed. The method whereby this is achieved is as follows:

At the particular interval of time during which a particular junctor is associated with the junctor processor 109 the state of the calling loop is recorded. Ten milliseconds later when the same junctor is again scanned the state of the loop is again examined. If the state is the same as it was previously the counter is stepped one and thereby records the fact that the loop is opened for a period long enough to constitute either an impulse or the final release conditons of the call. The discrimination between these two states is accomplished by reversing the function of the sensor and checking for a change of state of the calling loop from off-hook to on-hook. If the open circuit represents an impulse then the change of state of the loop will occur within a defined period. On the other hand, if the call has been terminated then no such change of state will be recorded, and, hence, the counter will reach its maximum position as an indication of this. The three bits, therefore, keep a record of the time of opened or closed loop conditions.

The fourth position of character B of the memory segment provides indication of whether or not an impulse received by the junctor and sensed by the supervisory processing circuit has been transferred to the common register processor 106. The fifth position of the character contains the parity bit.

Character C of each memory segment is utilized as a monitoring of line conditions and functions within the control system and also serves as a means for effecting release or connection of time shared equipment. A bit in the first position of character C is used to record the fact that the called subscriber has answered so that special sequences of events may be initiated which relate to functions required after the called subscriber has answered. For example, a bit in the first position of character C indicating that interconnection between the calling and called subscribers has been completed, serves as a means for distinguishing impulses received over the calling or called lines as a flashing condition, such as during a request for the conference circuit of the present invention, requiring recalling of time shared equipment, rather than a dialing condition which would require a different sequence of events. This first position of character C is also used to indicate that the called loop may instigate a release condition if the loop called remains open for greater than an assigned or predetermined period of time. The second and third positions in character C in each segment are used for release modes and control of the manner in which the call can be released. For example, specific combinations of the two bits are allocated to a normal release (00) and to a malicious call (01). Under the malicious call release a sequence of events can be started—when the calling party attempts to release—to hold the line circuit to the calling party until tracing of this circuit can be completed. The fourth position of the character C serves as a means of recording occurrence and completion of a sequence of events and provides a sort of scratch pad note to be made of this fact, which information is utilized in control of any following sequences. The fifth position of character C provides the parity or checking bit.

The fourth character D consists largely of a sequence store which determines what action has been taken by the processing circuit 201, when it has been seized. The first position of this character is used for instruction purposes to request the buffer 205 for transferring impulses or information for the supervisory processing circuit to the common register process 106. The second, third, and fourth positions of the character provide various combination of bits which indicate the various sequences which have been carried out by the control system. For example, indications that the signal network control has been seized and either a junctor control is associated with the call in order to release the junctor, or that the signal control has to be seized and an add-on conference junctor connected through the service link network and the junctor to the transmission circuit is indicated by the various bit combinations indicated as FIGURE 2B. In response to insertion of the bits in the proper positions in character D requiring certain sequences or the request of a buffer, control is effected through the service link network control and service link network to the various common circuits, which are available on a time share basis, for acquisition into the system at that time. The fifth position of the character D provides the parity or checking bit.

The character E contains basic information as to the classes of service of the calling and called subscribers in connection with the conference circuit of the present invention with position 1 of the character indicating whether or not the calling party has add-on conference features, position 2 indicating the necessity to refer the calling party to an external memory in order, for example, to accommodate abbreviated dialing from a caller. Positions 3 and 4 of the character perform similar operations as positions 1 and 2 but refer to the called subscriber. Position 5 of the character provides the parity or checking bit.

Referring once again to FIGURE 2A, the supervisory processing circuit 201 examines and acts upon the stored information in the memory and information received from the systems in the junctor 107 and as a result of this information it either connects to a register buffer 205 or to the service link network control 110. The service link network control 110 controls the crosspoints in the service link network 111 so as to interconnect the various common circuits with the junctor in control thereof. The register buffer 205 provides a means of associating the scanner, which is used for building up dialed digits, with the supervisory processing circuit and junctor memory operating on a time division multiplex basis with registers which store the digits and are provided on a traffic basis. In view of the asynchronous operation between the supervisory processing circuit 201 and the common register processer 106 a speed buffer of some type is required in between the two circuits so that information may be transferred from the supervisory processing circuit 201 during a given scan of the junctor 107 and the junctor memory 203 with storage of the information or impulses in the register buffer 205 being provided until access is available to the common register processor 106.

The common register processer 106 includes a register control 206 which performs timing and control functions and serves to transfer received impulses to the register sender system for further processing. Associated with the register control 206 on a time share basis is a register memory 207 and a dial tone applicator and outpulser circuit 208. The register memory 207 provides a segment for each of a plurality of dial tone applicators and outpulsers 208 and is capable of storing the address of the junctor associated with the outpulser circuit and retaining dial impulses for transfer via the register control 206 to the number translator 105 in the register sender.

The dial tone applicator and outpulser 208 controls the initial setting up of the call including application of dial tone and control of receipt of dialed impulses to the supervisory processing circuit in response to the register control 206. The register control 206 also provides control via the service link network control 110 and the service link network 111 of the various common circuits which are to be connected metallically through to the junctor. Either the supervisory processing circuit 201 or the register control 206 are capable of effecting such a metallic connection between the common circuits and the junctor via the service link network control 110 and the service link network 111 in response to control functions set up in either of these circuits.

The common circuits which perform the necessary service control may include, for example, a junctor release control 209, a ringing control 210, a junctor control 211, multi-frequency signal detector 204 and the add-on conference bridge circuit 212, of the present invention.

A brief description of the sequence of events and functions which make up the control procedure for setting up a call will provide a clearer understanding of the functions and relationships between the various circuit elements which are described above and therefore provide a more proper basis for understanding the operation of the conference circuit of the present invention. At the time a call is originated, the line scanner 103 detects an open line in a line circuit 101 and signals line link network control 104, which through the line link network 102 seeks out the open line and marks it in the conventional manner. At the same time, the line control 104 scans the junctors and dial tone applicator-out pulser circuits to find an available one of each which is not at that time in use. The available DTA circuit 208 and junctor 107 are each marked to indicate seize condition and the address of the selected junctor 107 is inserted via the register control 206 into the register memory 207 in the segment therein reserved for the particular DTA 208 which is marked. An electronic scanner 213 is provided between the plurality of DTA circuits 208, the register control 206, and the register memory 207 so that the register control is connected in turn to each DTA circuit at the time which its particular segment of the register memory 207 is available to the register control 206.

The DTA and outpulser circuit 208, the operation of which is described in detail hereinafter, causes the calling line to be extended from the line link network 102 to the junctor 107. This enables the junctor sensors to detect the condition of the calling loop and by comparing the state of the loop with the previous state stored in the junctor memory 203 in the supervisory processing circuit 201, an indication of the open condition of the line circuit can be inserted into the junctor memory 203 and control can be effected via the register control 206, DTA and outpulser circuit 208 and junctor control 211 to apply dial tone through the service link network 111 and junctor 107 back to the calling subscriber.

The calling subscriber now dials and the supervisory processing circuit 201 connected to the sensors in the junctor 107 builds up the impulses and digits received and signals these to the register buffer 205. The register buffer has a means of storing the address of the junctor 107 which is transferring information at a given time. The buffer 205 therefore receives not only impulse information or instruction but also the junctor address so that upon comparison of the junctor address stored in a given segment of the register memory 207 with the address stored in the register buffer 205 by the register control 206 a transfer of the information in the register buffer through the register control 206 to the register memory 207 will be effected at the time when access is available to the segment in the memory to which the information is to be applied. The register control is arranged to scan the register buffer at regular intervals, and each time the register buffer 205 is checked against a given register memory segment, a check is made for the presence of the junctor address, which was stored when the register was first allotted to the connection and if such an address identical to the memory segment is encountered, then the instruction character in the register buffer is transferred to the register control 206 and the register memory 207. In this way, the dialing pattern is processed by the supervisory processing circuit 201, analyzing on and off hook signals by measuring intervals in order to determine change of impulse and detect digits.

At any time that the change in condition of the line circuit is detected via the junctor sensors by the supervisory processing circuit 201 counting is initiated by a counter in the junctor memory 203 in character B thereof, bits 1, 2 and 3 to provide a means of monitoring and recording the time intervals between impulses and after control functions have been performed, such as application of dial tone to a calling line, and also to determine an end of digit condition. Whenever an impulse or an end of digit is recognized, then this information is transferred to the register control 206 together with the address of the junctor from which the information was received. When the register control has received a digit, reference is made to a translator 105 which determines whether the destination of the call is local or whether an outgoing trunk is required. The number translator 105 also provides indication as to whether or not the digit or digits received are sufficient to require further operations or whether or not additional digits will be necessary before further control will be required.

When the last digit of a local number has been received, control circuitry is utilized to determine whether the called line is busy or free. If it is found busy, the register control 206 with the dial tone applicator and out-pulser 208 mark forward through the service link network, the calling junctor 107, and the trunk link network 108 to the busy tone trunk 112 to return busy tone to the calling subscriber. At that time, the service link network 111, the dial tone applicator and outpulser 208 and register control 206 are released for use in connection with another call.

If a called number is found to be free after the last digit is received, the register control 206 effects the connection of the ring control 210 through the service link network 111, the calling junctor 107, and the trunk line network 108 to the called subscriber equipment. The ringing code and class of service, if any, of the called subscriber are obtained from the register control via the number translator 105. At this point, the register control 206 and the dial tone applicator and outpulser 208 may be released. A metallic path has now been established from the ringing control 210 via the cross points of the service link network 111, the junctor 107, the trunk link network 108, the line link network 102 to the called line. Ringing is applied over this path to signal the called station and ring back is applied to the calling subscriber. When the called party answers the ringing is tripped, the transmission circuit is extended through the junctor 107 from the calling line to the called line, and the service link network 111 and ringing control 210 are released. The called line sensor in the junctor 107 is now connected to the called line, except in metallic switch-through operations, and thus the supervisory processing circuit 201 can keep account of the state of both the called line loop and the calling line loop. The supervisory processing circuit now checks for flash or release from either the calling or called line; the flash in conjunction with the proper class of service of the flashing party as determined by the information stored in character E of the segment associated with the junctor 107 in the junctor memory 203 will permit connection of the junctor 107 via the service link network 111 to appropriate control circuits of trunks such as the add-on conference trunk 212 in a manner to be decsribed in detail hereinafter.

With the supervisory processing circuit 201 continuously monitoring the condition of the calling and called line circuits, the opening of either of these line circuits indicating an "on hook" condition by either subscriber will be detected in the supervisory processing circuit which will then acquire the SLN control 110 and service link network 111 once again. When the opening of the calling line circuit is detected through the junctor 107 by the supervisory processing circuit 201, the SLN control 110 initiates the release sequence by the connection of the junctor release control 209 through the service link network to the junctor 207 thereby freeing the junctor and the remaining service equipment in a manner to be described in greater detail hereinafter.

THE JUNCTOR CIRCUIT

The junctor circuit provides both sensors for detecting the condition of the calling and called line circuits and suitable controls for connecting via the service link network 111 the various common circuits which are necessary to effect service control for the system. This junctor additionally serves as both an originating and a terminating junctor incorporating a transformer bridge having a saturated inductor sensor in both the calling and called sides. The junctor circuit is arranged so that it has no inherent decision-making circuitry but is a slave to a processing control derived from the supervisory processing circuit and the register control. A schematic circuit diagram of the junctor circuit is illustrated in FIGURES 3A and 3B.

The main voice transmission path through the junctor is by way of the tip T and ring R leads from the line link network through the transformer bridge 301 to the trunk link network 108. A calling bridge CB in the form of a saturable core transformer has its input windings connected on either side of a DC isolation capacitor 302 in the calling side of the transmission bridge 301 with the opposite ends of the input windings connected to ground and negative DC respectively. Thus, upon closing of the calling line circuit, a DC path is completed from ground through the input windings of the calling bridge CB to negative DC voltage saturating the core of the transformer. Similarly, with an open condition of the line circuit, the path through the input windings of the calling bridge CB will be open and the core will remain unsaturated.

An answering bridge AB is provided on the called side of the transmission bridge 301 with its input windings connected on either side of the DC isolation capacitor 303 between ground potential and negative DC through the resistors 304 and 305, respectively. As in the calling bridge CB, a closed line circuit to the called subscriber will provide a closed path from ground through the input windings of the answering bridge AB to negative DC voltage saturating the core of the bridge while an open line circuit will provide no such complete path through the input windings, leaving the saturable core of the bridge in an unsaturated condition.

The condition of the calling and called line circuits connected to the junctor are monitored through an application of an interrogate or read pulse through the read windings of the calling bridge CB and answering bridge AB, which windings are connected in series through leads 310 and 311 to the electronic scanner 202, which pulses these windings every 10 milliseconds to determine the condition thereof. If the calling or called line circuits are open an output pulse will be generated in the output windings and applied to the junctor supervisory processing circuit 201 via leads 314 and 315 from the calling bridge or via leads 316 and 317 from the answering bridge, as the case may be. However, if a line circuit is closed indicating an "off hook" condition, the core of the bridge associated with this line circuit will become saturated due to the closed circuit through the input windings of the bridge, and so application of an interrogate or read pulse to the input windings of the bridge will result in no signal output from the read-out windings thereof. Thus, the condition of the line circuits is determined by the presence or absence of an output from the readout windings of the calling bridge and answering bridge in response to continuous scanning or pulsing thereof.

The service link network 111 has five output leads, T, R, S, MK and CO over which the various control signals for effecting the functions associated with the junctor are transmitted. There are six main relays in the control portion of the junctor circuit, each providing a function or functions in response to control transmitted through the service link network 111. The change-over relay CO is a bipolar relay which permits double use of the control leads T, R, and MK thereby making it possible to apply different control signals from the service link network to the junctor in a number in excess of the individual leads which interconnect these circuit elements. The change-over relay CO also provides a means for isolating the control leads T and R from the transmission line T and R during control functions so as to prevent noise transmission along these transmission circuits.

The relay RD which is connected through the control line T to the service link network serves as a means for placing a holding ground on the sleeve lead S back to the line link network and also connects the line link network to the calling side of the transmission bridge 301 so as to make possible a monitoring of this line by the supervisory processing circuit detecting sensors in the junctor. The relay SR which is connected through the control line MK to the service link network provides for a reversal of battery to the calling line circuit upon detection of an "off hook" condition at the called subscriber end of the system.

The relay RT connected to the control line CO to the service link network provides a holding ground forward towards the trunk link network on the sleeve lead S and also connects the line circuit of the called party to the transmission link 301 in the junctor so that a monitoring of the condition of this line circuit by the supervisory processing circuit through detection of sensors in the junctor can be effected. The relay RT shares this line with the change-over relay CO and operates in conjunction with this relay such that depending upon the polarity of the signal applied to the control lead, it is possible to either operate the change-over relay CO and the relay RT simultaneously or to effect operation of the change-over relay CO and release of the relay RT.

Each of the relays in the junctor is a latching relay with the exception of the relay CO, which is a bipolar relay and each of these latching relays is set by a positive pulse and reset by a negative pulse. Thus, application of a negative pulse on the control lead CO will set the change-over relay CO via the rectifier 320, however, the RT relay will remain reset due to the polarity of this pulse. Once the relay CO has been set a positive pulse can be applied to the lead CO which will pass through the rectifier 321 in view of the previously set condition of the relay CO and retain this setting of the bipolar relay, however, due to the polarity of this pulse it will also set the relay RT at this time. On the other hand, if the change-over relay CO is in the reset condition and a positive pulse is applied to the control line CO, the relay RT will first be set and then the relay CO will be set via the rectifier 321. In this way, it is possible depending upon the polarity of the control signal applied to the line CO to set only the relay CO, set both the relay CO and the relay RT, and set the relay RT and then the relay CO in consecutive order. Since the latter operation is substantially instantaneous, it is seen that the relay CO can be set any time with either a positive or a negative pulse applied to the control line CO.

The relay TK connected to the control line R to the service link network provides a means of extending a dry loop toward the trunk link network thereby obviating the need for a trunk circuit when the outgoing trunks are dialable trunks. This is effected by connecting across the capacitor 303 on the called side of the transmission bridge 301 in the junctor by way of the lead 322 and the diodes 323 and 324. This effectively removes DC from the called side of the transmission bridge 301.

The relay CN provides a means of switching through metalically when the call is either to an outgoing trunk or from an ingoing trunk. This relay operates in conjunction with the relay TK, and like relay CO is a bipolar relay. When the relay TK is set, ground is applied to the relay CN via the unoperated contact of RD setting the relay via line 325. This connects the line 326 to the sleeve lead S which maintains a holding ground on the relay CN during the switch-through process.

The junctor also incorporates a winding 330 on the transmission bridge 301, which winding is connected via the control lead MK to the service link network and serves as a means of feeding dial tone or ring back tone toward the calling line on a transformer induced basis.

A relay SL is provided as a special feature of the junctor circuit and serves as a stuck relay control which is activated at the time the junctor is freed from a transmission circuit and whenever one of the relays of the junctor remains in the set condition and thereby prevents further access to this junctor until it is determined whether or not the condition is due to a control function or whether it is due to a misfunction of one of the relays in the junctor circuit.

The transmission line MK from the line link network into the junctor is marked when the junctor is connected to the line link network thereby indicating the busy condition or free condition of the junctor, as the case may be.

JUNCTOR RELAY CONTROL

The junctor relay control illustrated in detail in FIGURE 4 is utilized in combination with the dial tone applicator and out pulser circuit 208 to control the junctor relays during the initial stages of setting up a call and also controls the junctor circuit in response to the register processer 106 and supervisory processing circuit 201 to set up the necessary switching combination in the junctor circuit for effecting operations during a call and upon termination thereof. There are preferably two junctor relay control circuits provided in the system for the plurality of dial tone applicator and out pulser circuits 208, which make use of the two junctor relay controls on a time share basis. Of course, additional junctor relay control circuits, or only one circuit, may be provided without departing from the spirit and scope of the instant invention in accordance with the requirements of the overall system.

As indicated above, as soon as an open line circuit is detected and the condition signalled to the line link network control 104, a sequence of events is initiated under control of the common register processor 106 which results in the application of dial tone to the line circuit of the calling party. This sequence of events is programmed in the common register processer 106 which supplies the control signals, in the proper timed sequence via the junctor relay control 211 and dial tone applicator and out pulser circuit 208 through the service link 111 to the proper relays in the junctor 107 for effecting this operation. The junctor relay control signals are applied from the common register processer 106 to the junctor relay control 211 at input AND gates 400 through 407, as seen in the detailed circuit diagram of FIGURE 4. The input control signals include CO positive and negative (COP and CON) signals, T positive and negative (TP and TN signals), R positive and negative (RP and RN signals), S positive (SP) and MK negative (MKN signals). The manner in which these control signals are utilized to effect actuation of the proper relays in the junctor 107 to perform the desired functions will be described in greater detail hereinafter in connection with the description of the dial tone applicator and outpulser circuit 208.

The AND gates 400 through 407 are enabled by the output signal from AND gate 408 which is controlled by a set signal SET and a signal BF from the programmer in the common register processer 106. The signal BF for enabling the AND gate 408 may also be derived from the output of AND gate 409 as will be described in greater detail hereinafter. The control signals from the register processer 106 are applied through the enabled input AND gates 400 through 407 to respective input flip flops 411 through 418, which are set by application of the control signals thereto. The outputs of flip flops 413 through 418 are applied to AND gates 423 through 428, respectively, which in turn place these control signals on the lines T, R, S, CO, HLD and MK respectively, to the associated dial tone applicator and out pulser circuit 208 to which the junctor relay control circuit is connected.

The enabling of the AND gates 423 through 428 so as to permit the control signals from the common register processor 106 to pass through to the dial tone applicator and out pulser circuit is effected under a timed sequence controlled by a binary counter 421 which is started through application of a start signal PL upon coincidence of a timing pulse from a 200 pulse per second source and either of the signals COP or CON applied via respective flip flops 411 and 412 through OR gate 419 to AND gate 420. The timed order of operation provided by the binary counter 421 is necessary to insure that prior to application of control pulses from the junctor relay control through the dial tone applicator and out pulser circuit and service link network to the junctor, the relay CO in the junctor is set either by a control signal COP or CON from the common register processer 106 so that initially the tip T and ring R transmission lines in the junctor to the trunk link network are isolated from the corresponding T and R control lines connected to the service link network, thereby preventing feedback of control impulses from the relays to the transmission line.

Thus, as soon as the control signal COP or CON is applied to its respective AND gate 400 or 401, this control signal is immediately applied to the line CO to the dial tone applicator and out pulser circuit (FIGURE 5A) to set the relay CO in the junctor via the service link network and also, at the same time, is applied through OR gate 419 to AND gate 420, whereupon coincidence with a pulse from the pulse source connected to the AND gate applies the start signal PL to the binary counter 421. The binary counter 421 then begins its binary count until it reaches a count of six (0110) which enables the AND gate 422 applying a start signal to the flip flop 410. With the setting of flip flop 410, the AND gates 423 through 428 are enabled in coincidence with the control signals applied via flip flops 413 through 418 and the control signals are then applied to the appropriate lines to the dial tone applicator and out pulser circuit.

At the same time, the zero output from each of the flip flops 410 through 418 is applied to AND gate 431, which monitors the set condition of each of the flip flops 410 through 418, which signal is represented by an output to AND gates 432 and 430. The AND gate 432 also receives a signal from AND gate 433 connected to the reset or "not" outputs of the binary counter indicating the operating condition of the binary counter. The output of AND gate 432 represented by the signal BF therefore indicates the busy condition of the junctor relay control. This signal BF is utilized during the initial selection of a free junctor relay control to be associated with the dial tone applicator and out pulser circuit as will be described in more detail hereinafter.

The binary counter 421 continues its binary count until it reaches a count of 12 (1100) at which time the AND gate 429 is enabled providing an output signal which resets each of the flip flops 410 through 418. The reset condition of the flip flops is then detected by AND gate 431 providing an output signal to AND gate 430 in coincidence with the output of AND gate 429 which resets the binary counter. This reset condition of the counter in the flip flops is also monitored at AND gate 432 which then indicates the free condition of the junctor relay control and enables its use immediately in conjunction with another dial tone applicator and out pulser circuit.

DIAL TONE APPLICATOR AND OUTPULSER

The dial tone applicator and out pulser circuit may be divided into a mechanical portion, as illustrated in FIGURE 5A and an electronic portion as illustrated in FIGURE 5B. The mechanical portion contains the various relays which connect the output control lines from the junctor relay control 211 through the service link network 111 to the junctor 107. In response to control signals applied through the electronic portion of the dial tone applicator and out pulser from the common register processer 106.

Looking to FIGURE 5A, the input control lines T, R, S, CO, HLD and MK are provided in duplicate for connection to the two respective junctor relay control circuits available to the plurality of dial tone applicator and outpulser circuits in the system. The two sets of input control leads in the mechanical portion of the dial tone applicator and outpulser circuit are suffixed either with a designation (A) or a designation (B) depending upon whether they are connected to the A junctor relay control or the B junctor relay control. The outputs BF from each of the junctor relays controls A and B are applied to the electronic portion of the dial tone applicator and outpulser in FIGURE 5B to respective AND gates 500 and 501.

As indicated above, at the time a dial tone applicator and outpulser circuit and a junctor circuit is elected by the common register processor 106 for processing a given call, the address of the associated junctor is stored in the register memory 207 which is periodically scanned to provide access between the various portions of the memory and the common equipment on a time share basis. When the address of an associated junctor and dial tone applicator and outpulser circuit is detected by a register cell address scanner (not shown) in the common register processor 106, AND gate 502 in the electronic portion of the dial tone applicator, and outpulser circuit (FIGURE 5B) is enabled, thereby applying an enabling signal to the AND gates 500 and 501. If at this time the junctor relay control A is free for connection to the dial tone applicator and outpulser circuit, coincidence will occur at AND gate 500 enabling this AND gate and applying a signal BFA to the register common processing circuit which in turn will apply the signal BF in coincidence with a SET signal to AND gate 408 in the junctor relay control enabling the input AND gates 400 through 407 therein. If, on the other hand, the junctor relay control A is occupied at the time that the associated register cell in the register memory 207 is being scanned, and if the junctor relay control B is free for connection to the dial tone applicator and outpulser circuit, coincidence will occur at AND gate 501 which provides a signal BFB to the register processer so that the input AND gates in the junctor relay control B may be enabled. If both the junctor relay controls A and B are in use at the time of scan of the associated register cell, no connection will be effected between the dial tone applicator and out pulser circuit and a junctor relay control until the next scan of the associated cell when one of the junctor control circuits is available. This process will continue until a junctor relay control is available to the dial tone applicator and outpulser circuit.

Upon connection of a junctor relay control to a dial tone applicator and outpulser circuit and application of an input pulse COP or CON to the junctor relay control sufficient to enable OR gate 419, an output pulse will be applied to the control line HLD from the junctor relay control to the electromechanical portion of the dial tone applicator and outpulser circuit enabling either the relay RCA or the relay RCB, depending upon which of the two junctor relay controls A or B is selected, in coincidence with setting of the associated flip flops 503 or 504 in the electronic portion of the dial tone applicator and outpulser circuit by the common register processor 106.

The flip flops 503 and 504 are set by way of AND gates 505 and 506, which are enabled by coincident signals from the address AND gate 502, a respective signal RCA or RCB from the register processor 106 and reset signals from flip flop 510 associated with the dial tone circuit and the flip flop associated with the other AND gate, either 503 or 504. In this way, the relay RCA, for example, is set only if the junctor relay control A is available, if the signal RCA from the register processor 106 is applied to AND gate 506, if the flip flop 503 associated with the junctor relay control circuit B is reset, and if no dial tone has been applied to the output control leads from the dial tone applicator and outpulser circuit. The relays RCA and RCB serve to activate one or the other of the two sets of input control leads into the electromechanical portion of the dial tone applicator and outpulser circuit as is evident from FIGURE 5A.

The remaining inputs into the electromechanical portion of the dial tone applicator and outpulser circuit are the dial tone leads DT and DTG connected to a dial tone generator of conventional configuration. The dial tone lead DT is connected to the output control line MKF to the service link network 111 and the junctor 107 upon actuation of the dial tone relay DT in the electromechanical portion of the dial tone applicator and outpulser circuit (FIGURE 5A), which relay is activated in accordance with a timed sequence by the programmer in the common register processor 106 via line DT to AND gate 511. The AND gate 511 is enabled by coincidence of the control signal DT from the processor with the output of AND gate 502 connected to the register cell address scanner in the processor.

A relay RD is provided in the electromechanical portion of the dial tone applicator and outpulser circuit which is energized upon application of control pulse RD from the register processor 106 to AND gate 512 which sets flip flop 508 upon coincidence with the output signal from AND gate 502 connected to the register cell address scanner. The energization of relay RD serves to place a ground on output control line S through the service link network to the junctor which enables the marking from the junctor back to the line link network. A relay SR is provided in the electromechanical portion of the dial tone applicator and outpulser circuit in series with the control line R and serves to effect a monitoring of the reversal of battery on the called side of the transmission bridge in the junctor under control of the register processor 106. Energization of the relay SR upon application of the proper pulse to the line R from the junctor relay control places a ground on the lead SR to the electronic portion of the dial tone applicator and outpulser (FIGURE 5B) which is applied to AND gate 513, enabled by the output of AND gate 502 connected to the register cell address scanner. The condition of the called side of the transmission line is then applied to the register processor via the AND gate 513 which condition is determined by whether or not the polarity of the called side of the transmission line will energize or not energize the relay SR and therefore apply a ground to AND gate 513. A relay SH is also provided in the electromechanical portion of the dial tone applicator and outpulser, which when energized through application of a control pulse SH through AND gate 514 in coincidence with the output of AND gate 502 to flip flop 509 serves to shunt the relay SR, preventing operation of this relay and providing a low impedance path for outpulsing.

When it is determined by the number translator 105 after receipt of dialed information from the calling subscriber that an outgoing trunk circuit to other common control equipment must be effected, it is necessary to transfer the dialed information stored in the register memory 207 through the service link network 111 and junctor 107 to this outgoing trunk circuit for storage and further processing in the other common control equipment. This function is carried out by the outpulser section of the dial tone applicator and outpulser circuit. Outpulsing is effected through a relay PL controlled by application of control pulses PL through AND gate 515 to flip flop 507 in coincidence with the output of AND gate 502 from the register cell address scanner. Energization of the relay PL provides a direct connection 516 between the output control lines T and R in the electromechanical portion of the dial tone applicator and outpulser circuit, thereby providing an outpulsing through service link network 111 and junctor 107 to the outgoing trunk circuit. This outpulsing is carried on under control of the register processor 106 in accordance with the information stored in the register memory 207.

An AND gate 517 in the electronic portion of the dial tone applicator and outpulser circuit (FIGURE 5B) is connected to the register processor 106 and is energized by detection therein of the address of the preceding register cell stored in the register memory 207 to the cell which is associated with the particular dial tone applicator and outpulser circuit, and this AND gate 517 serves to reset the flip flops 503, 504, 507, 508, 509 and 510, thereby insuring that no incorrect information is stored in the flip flop just prior to scanning of the register cell in the register memory 207 which contains information for the dial tone applicator and outpulser circuit. Upon scanning of the appropriate cell in the memory, the electronic portion of the dial tone applicator and outpulser circuit is ready for receipt of information.

A relay BY in the electromechanical portion of the dial tone applicator and outpulser circuit is provided as part of the general alarm circuit providing monitoring of the condition of the various relays in the system and prevents use of the equipment upon detection of an improper condition of any of the relays PL, RD, SH and DT which are of the latching type in the electromechanical portion of the circuit. If at a time of inactivity of the circuit any of the relays remain operated, the relay BY will be energized applying a signal ALM through AND gate 518 in coincidence with the output of AND gate 502 from the register cell address scanner to the register processor 106, when the circuit is first scanned by a register, thereby preventing the application of control information and instruction to this circuit.

In order to provide a clearer understanding of the functions of the junctor relay control and dial tone applicator and outpulser circuit the following description of the operation of these circuits from detection of an open line circuit of a calling subscriber to the application of dial tones to this line circuit will now be set forth.

At the time a call is originated, the open line resulting from an off-hook condition is detected by the line scanner 103 which signals this condition to the line link network control 104. The line link network control scans the junctors and the dial tone applicator and out pulser circuits to find an available one of each as determined by the condition of the MK circuit in both the junctor and the dial tone applicator and out pulser circuits. When a free dial tone applicator and junctor are selected, the address of the junctor is stored in the dial tone applicator and out pulser portion of the register memory 207, which has a portion or cell allocated for each dial tone applicator and out pulser circuit for which it is available.

The programmer in the common register processor 106 then initiates a timed sequence of events which eventually results in the application of dial tone back through the dial tone applicator and out pulser circuit, the service link network 111, the junctor 107, and the line link network 102 to the calling line circuit 101. This sequence of events begins by application of a control signal RD through the AND gate 512 in coincidence with the output of AND gate 502 from the register cell address scanner to set flip flop 508 in the dial tone applicator and out pulser circuit (FIGURE 5B). Upon setting of the flip flop 508, the relay RD in the electromechanical portion of the dial tone applicator and out pulser circuit is energized, and places ground on control line S through the service link network to the junctor 107 where it is applied to the transmission line S back to the line link network establishing connection between the line link network and the junctor in accordance with a typical marking operation through a finder sequence. However, since the relay RD in the junctor is not as yet operated, the change in condition of the calling line due to the off-hook condition cannot as yet be detected by sensors in the junctor.

At this point, it is necessary to operate the relay CO in the junctor to connect the output control leads from the junctor to the junctor relays and isolate the transmission lines on the called side of the transmission bridge in the junctor from the junctor relay control circuit and the dial tone applicator and out pulser circuit for the following sequence of operations. This is effected through application of negative signal CON from the programmer in the register processer 106 to AND gate 401 and the junctor relay control which, as indicated above, sets flip flop 412 providing the proper output control signal to the line CO in the junctor relay control from which it is applied through the line CO in the dial tone applicator and out pulser circuit (FIGURE 5A) through the service link network 111 to the control line CO in the junctor 107 to set the relay CO.

At the same time, the setting of the flip flop 412 enables OR gate 419 in the junctor relay control which subsequently enables AND gate 420 upon coincidence of the next pulse from the 200 pulse per second pulse source to start the binary counter 421. When a count of binary 6 is reached by the binary counter AND gate 422 is enabled setting flip flop 410 which enables each of the AND gates 423 through 428 in the junctor relay control providing application of the control signals applied to the input AND gates 402 through 407 from the common register processer 106 through the dial tone applicator and out pulser circuit and the service link network 111 to the junctor 107. During this period when the AND gates 423 through 428 are enabled in the junctor relay control a control signal is applied to each of the output control lines T, R, S, CO and MK through the dial tone applicator and out pulser circuit to the junctor 107 to insure that the relays in the junctors are set properly for the following operation. Under control of the common register processer 106 a positive signal is applied through AND gate 402, flip flop 413 and AND gate 423 to line T in the junctor actuating relay RD thereby connecting the calling bridge CB to the transmission lines T and R from the line link network. Negative signals are applied to the output control lines R and MK of the junctor relay control to the corresponding lines in the junctor to relays TK and SR to insure that these relays remain in the reset condition. Actuation of the relay RD in the junctor in addition to connecting the calling bridge CB to the line link network also places a ground on the transmission line S to the line link network so that the ground applied to this transmission line from the dial tone applicator and out pulser circuit through energisation of the relay RD therein can be removed at the end of the scan of the address cell in the register memory 207 without disconnection of the junctor from the line link network.

Under control of the common register processer 106 in accordance with the timed sequence the signals on line T, R and MK in the junctor are first removed and then the output signal on lead CO in the junctor is removed to deactivate the relay CO. Since the relays RD, TK and SR are latching relays, the previous condition of the relays will be maintained even after the signals are removed; however, since the relay CO is a polar relay, this relay is deactivated by removal of its control signal.

The program in the register processor 106 is then providing for an application of control signal DT to the dial tone applicator and out pulser to enable AND gate 511 and set flip flop 510 thereby energizing the relay DT in the circuit. As soon as the relay DT is energised the dial tone generator is connected via the line DT to the output control line MKF from the dial tone applicator and out pulser circuit connecting the dial tone generator to the line MK in the junctor, which, due to the condition of the relays CO and TK, is connected to the winding 330 of the main transmission bridge 301 in the junctor inducing dial tone in the calling side of the bridge to be applied back through the line link network to the line circuit of the calling party.

With dial tone now applied through the junctor to the calling party and with the condition of the calling line being monitored by the sensors in the junctor, which are connected to the supervisory processing circuit 201, further control of the call is vested in the supervisory processing circuit under command from the common register processor 106.

SUPERVISORY PROCESSING CIRCUIT

FIGURE 6A shows a general arrangement of the supervisory processing circuit 201 which is time divided over a number of junctors so as to provide control for a plurality of calls at a given time. The time division is accomplished by a scanner circuit 202 which pulses into the calling and called sensors of each junctor in turn, which sensors are provided in conjunction with a saturated inductor so that whenever the calling or called loop is open an inductive coupling exists between the windings of the sensor and hence, an output pulse occurs. When, however, current flows in either the calling or called loops then the transformer is saturated and no coupling exists so that there is no output pulse derived therefrom. In this way, it is possible to build up a logic pattern of open and closed states on the sensor and thus detect impulses derived from the calling line. Since the scanner examines each junctor at regular intervals, it is possible to relate the state of the loop and the time of the scanning with the record of the previous state of the loop, maintained in the junctor memory 203, which is available at each examination of the condition of the line to which the junctor is connected. This detection of line condition change plus existing line condition serves as means for initiating control functions via the common register processor 106.

Referring now to FIGURE 6A, there is provided a schematic diagram of the switching arrangement between the supervisory processing circuit 201, the junctor memory 203, and the plurality of junctors 107 associated with these elements by means of the electronic scanner 202. The scanner 202 may comprise a chain counter or any other well known device for sequentially pulsing the interrogate windings in both the calling and called bridges of each of the junctors 107. This sequential scanning of the interrogate windings in the junctors 107, which may be carried out through use of a conventional scanner matrix in conjunction with a series counter arrangement, is effected in synchronism with a sweeping of the junctor memory 203 so that as each given cell associated with a given junctor is acquired in the junctor memory 203 a coordinate acquisition and connection of the junctor to the supervisory processing circuit 201 is effected under control of the electronic scanner 202. The scanner is operated under control of a suitable clock signal and reset signal which are applied to the supervisory processing circuit 201 to effect coordinate control thereof. As will be indicated in greater detail hereinafter, the supervisory processing circuit 201 accepts information from the individual junctors scanned by the electrode scanner 202 and compares this information with the information in the junctor memory as to the previous condition of the line circuits connected to the junctor and this information along with data from the common register processors is used to update the junctor memory and also effect control of the various common circuits either through the service link network control 110 and service link network 111 or through the register buffer 205 and register control 206.

Referring to FIGURE 6B, which shows a schematic diagram of the supervisory processing circuit 201 with only one pair of called and calling sensors illustrated in the diagram so as to avoid the complication caused by illustration of duplicate equipment, it should be understood from the above mentioned description of FIGURE 2A that the sensors in the junctor are sequentially connected to the supervisory processing equipment so that at any given time only one pair of sensors from a single junctor will be connected to the circuit. FIGURE 6B schematically illustrates such a condition.

The read out windings 600 of the calling sensor and the read out winding 601 of the called sensor are connected respectively to flip flops 602 and 603, which devices are set by application of a pulse from the read out winding, but remain in the reset condition if due to the saturation of the core in the calling or called bridge no pulse is provided by the read out winding upon interrogation of the calling and called sensors. Thus, the set or reset condition of the flip flop 602 and 603 determine the condition or state of the calling and called line circuits, respectively. The clock pulses applied to the electronic scanner 202 serve to interrogate the sensors in each junctor once every ten milliseconds so that a dialed impulse which is 20 milliseconds in length will be sensed at least twice during its duration by the supervisory processing circuit thereby insuring that the loop is closed or opened for a definite period of time before the condition is recognized as a distinct signal and not a bouncing contact.

The supervisory processing circuit includes a series of twenty-five AND gates 604 through 629 which individually receive a respective one of the twenty-five bits of information stored in the junctor memory 203 associated with the particular junctor which at that time is being scanned and apply these bits of information to a series of flip flops 630 through 655 upon coincidence at the AND gates 604–629 of a timing pulse from READ flip flop 656. The bits of information stored in the information flip flops 630–655 are applied to a data control network 660 which consists of an AND gate arrangement for combining the information provided in the junctor memory 203 with the updated information provided by the sensors in the junctor and data provided from the register processor 106. For example, during examination of the sensors in a given junctor the twenty-five bits of data in the junctor memory associated with this junctor are applied to the data control network 660 via the AND gates 604–629 and flip flops 630–655. At the same time, any chage in data present in the junctor memory and available through the register processor is also applied to the data control network. The AND gate arrangement in the data control then provides a logical comparison between the previously stored data and the updated information provided from the junctor and the register processor and rewrites this information to provide a more correct representation of present conditions in the system.

Referring temporarily once again to FIGURE 2B, the information in the character A, bits 3 and 4 representing the condition of the calling and called line circuits, respectively, from the memory would be compared with the data stored in flip flop 602 and 603 and detected changes in this condition would then be written into the memory at these locations by suitable AND gates. In addition, information for example in character A, bits 1 and 2, providing for a condition of the system, and data for example in characters C, D and E which represent subscriber information provided by the translator via the processor, and also represent conditions in the system, would be supplied by the register processor to the data control network where it is compared with the data already written into the junctor memory so that a logical ANDing of the data will provide an updating of the information in the junctor memory. In character B, bits 1, 2 and 3 represent a counting sequence provided by the register processer so that during each scan the progress of the counter is applied to the data control network where it is then written into the junctor memory. The result of the logical ANDing of the information provided from the junctor and the register processer with the data supplied from the junctor memory is applied through suitable outputs through AND gates 661–685 back to the junctor memory. The AND gates 661–685 are enabled by an output from WRITE flip flop 686 which is set as soon as all of the information applied to the data control network 660 has been processed by that network.

Due to the complexity of the logical arrangement of the AND gates and the data control network resulting necessarily from the combination of a multiple of twenty-five AND gates for insuring correct processing of the applied information, a detailed illustration of the data control network has not been provided. However, it should be sufficient for an understanding of this invention that the data control network 660 provides for a logical combination of the individual bits of information stored in the junctor memory with updated bits of similar information provided by the junctor and the register processer so as to correct or revise the information in the memory during each scan thereof.

Since certain data appearing in the junctor memory in addition to the data indicating the condition of the calling and called loops serve as means for initiating operation of various circuits in the system, the data resulting from the logical combination of information from the junctor, the register processer 106 and previously stored information in the memory is not only written back into the memory, but appropriate bits of information are also transferred via the register buffer 205 to the register control 206 in the register processer 106. The register control 206 stores this information in the register memory 207 and also utilizes this information to control the various common circuits required for a particular function. This output data is also applied from the data control network 660 directly through the service link network control 110 to the service link network 111 where it may act directly upon certain of the common circuits associated therewith.

Looking once again to the operation of the system in conjunction with the supervisory processing circuit, with dial tone applied from the dial tone applicator and out pulser circuit 208 under control of the register control 206 through the service link network 111, junctor 107 and line link network 102 to the line circuit 101, any change in the condition of the calling line circuit will be detected by the supervisory processing circuit, which scans the calling sensor in the junctor connected to the line circuit every ten milliseconds. When the calling party begins dialing, the change in condition of the line circuit from open to closed is detected and stored in the junctor memory during the next scan of the junctor. In addition, the change in condition of the line circuit causes a change in the condition of the character A, bit 1, of the junctor memory from a zero to a one to indicate the present use of this memory cell. The condition is also applied to the register processer 106 which starts the sequence counter therein provided for timing the intervals between detected pulses in the line circuit.

During each successive scan of the junctor memory at five millisecond intervals, the bits 1, 2 and 3 in character B of the memory are stepped by the counter in the register processer 106 to provide a count of the time interval subsequent to the receipt of the change of line condition. This timing is continued until it is determined whether the change in line condition is the result of a dialing impulse or whether or not the calling subscriber has hung up, as indicated by the expiration of a predetermined period of time resulting in a predetermined count in the memory. In case of the latter situation, the connection to the line circuit is terminated unless a particular class of service prevents this, and the time share equipment is disassociated from the junctor and supervisory processing circuit.

In the case of a dialing condition a dialing pulse indicated by an open circuit will be detected in the supervisory processing circuit which writes the information in the memory during the next scan and the counter in the common register processer 106 is reset and begins its count once again, the count being inserted during each scan into character B in the junctor memory. As indicated previously, at least two scans of the junctor sensors occur during each dialing impulse so as to insure that the change of line condition is a dialing impulse rather than a bouncing contact.

After the dialing impulse has been detected twice in the supervisory processing circuit, bit 1 of the character D of the junctor memory is changed from a zero to a one indicating that the register buffer 205 should be requested. This instruction stored in the memory is also applied to the register buffer and the instruction in character D of the memory is repeated until the buffer which is provided on a time share basis is available for association with the supervisory processing circuit. After the buffer is seized and during the next cycle, the dialing impulse is transferred to the buffer where it will be shifted to register control 206 and register memory 207. As a result of receipt of a dialing impulse which has now been transferred to the register control 206, it is necessary to remove dial tone from the line circuit of the calling party, which function is performed by the dial tone applicator and out pulser circuit under control of the common register processer 106. At the same time, the counter in the junctor memory continues its count to determine interpulse interval.

The supervisory processing circuit may next detect a closed condition in the junctor sensor indicating a dialing impulse, which again is stored in the register memory and serves to reset the counter in the memory to measure the interpulse interval. This counting subsequent to the detection of a dialing impulse will continue either until a next impulse is detected or until a 40 millisecond time period has expired as indicated by a control signal from the register processor 106. When the 40 millisecond pulse is received from the processor an end of digit sequence is initiated.

If additional dialing impulses are received from the supervisory processing circuit from the junctor 107, in each case the impulse detected is stored in the junctor memory and applied through the register buffer 205 to the register control 206 and register memory 207 along with resetting of the counter and the junctor memory to determine the interpulse interval. When the last impulse of a digit has been received, the counter in the junctor memory will continue its count until the first forty millisecond pulse is received from the register processor 106, the counter having reached a binary count of 100 at this time, the counter is then stopped and retains its binary count until the next 40 millisecond pulse is received from the register processor 106 at which time the counter shifts to binary 101. The counter retains its binary count until a third 40 millisecond pulse is received from the register processer which then shifts the counter to a binary 111 indicating an end of digit condition.

During the next scan, the buffer is requested by the supervisory processing circuit, and when received, the end of digit signal previously inserted into the junctor memory, upon receipt of the third 40 millisecond timing pulse, is transferred through the buffer to the register control memory indicating that a complete digit has now been stored in the register memory. As soon as information is received in the register processer to indicate that the first digit has been dialed and stored in the register memory, reference is made to the number translator 106. If the destination of the call can be determined at this time from the digit which has been received, the translator supplies this information to the register control 206 which then takes further action to complete the call.

However, if the destination of the call or other required information cannot be supplied at this time, then the register control refers to the translator 105 again after the second digit has been received and repeats this procedure after each digit received until information as to the destination of the call, whether it be a local call or an outgoing call is provided by the number translator. If the call is finally determined to be local, then the register marks the called line circuit through the line link network control and by a conventional marking operation the junctor 107 is connected through the line link network to the called party. Ringing is then applied to the called line loop provided the line is not busy at the time of connection thereto, and ringing to the called line circuit with the ringback to the calling line circuit is maintained until the called party answers, as indicated by a reversal of battery in the called line loop, or the calling party hangs up, as indicated by a change in the condition of the calling line loop. When the called party answers the ring, a connection is established between subscribers through the junctor 107.

JUNCTOR RELEASE CONTROL

The junctor supervisory and release control includes an electronic portion shown in FIG. 7A and an electromechanical portion shown in FIG. 7B. The electronic portion provides for a concidence between the junctor address and the address associated with stored information in the register control 206 with the instruction from the register control being applied to the electromechanical portion of the junctor release control upon coincidence of the two addresses. The junctor release control provides for release of the junctor, release of the SR relay in the junctor, and operation of the SR relay in the junctor for purposes of terminating a call or for use during switch-through trunk calls and non-switch through trunk calls. The circuit provides for a busy store flip flop which indicates through application of a controlled output the condition of the junctor release control during the attempted acquisition thereof by the supervisory processing circuit.

The "X" and "Y" portion of the junctor address associated with the call requiring the services of the junctor release control is applied via the service link network control 110 and service link network 111 to input address flip flops 1000–1007, which in accordance with the set or reset condition determine the address of the junctor associated therewith. The junctor address stored in the register member 207 along with appropriate instruction for further processing or control of the system is applied via the service link network control 110 and service link network 111 to input coincidence AND gate 1008–1015 and 1016–1023, to which the set and reset outputs of the flip flops 1000–1007 are also applied.

A coincidence between the two addresses at the coincidence AND gates 1008–1023 enables these AND gates providing a coincidence signal via the OR gates 1024–1031 to control AND gates 1032 and 1033 controlling the "X" and "Y" portions of the address, respectively. The flip flops 1032 and 1033 and the outputs of AND gates 1008–1015 and 1016–1023, respectively, applying the resulting control signal to each of the instruction AND gates 1034–1039. Instruction signals for operation of the SR relay in the junctor are applied to the instruction AND gate 1034, a signal for release of the SR relay in the junctor is applied to AND gate 1035, signal for release of the junctor is applied to AND gate 1036, a reset signal is applied to AND gate 1037, and alarm signal is applied to AND gate 1038 and an "enable alarm" signal from the alarm circuit is applied to AND gate 1039.

Thus, upon coincidence of the two addresses applied to the junctor release control the instruction AND gates will be enabled by the application of any instruction signal from the register control 206. The output of AND gate 1034 represents an "operate SR" relay signal applied to information flip flop 1040 setting this flip flop to provide an output for control of the electromechanical portion of the junctor release control in FIG. 7B. In a similar way, the release SR relay signal derived from AND gate 1035 and applied to information flip flop 1041 sets the flip flop and applies a control signal to the electromechanical portion of the system. The release junctor signal derived from AND gate 1036 is applied to information AND gate 32 which sets the AND gate and also applies the control signal to the electromechanical portion of the circuit. The output of AND gate 1037 provides a reset signal which is applied to the information flip flop 1042 and to each of the address flip flops 1000–1007 to reset each of these flip flops. In addition, the reset signal is also applied through a pair of OR gates 1043 and 1044 to reset the information flip flops 1040 and 1041. The OR gates 1043 and 1044 are also used to insure proper setting of the information flip flops 1040 and 1041 by providing complementary signals to the reset side of these flip flops to insure their proper setting for each control.

As in the case of the register buffer 205 and the ringing control circuit 210 a busy store flip flop 1045 is provided in the junctor release control circuit to indicate the busy or free condition of the circuit. Each of the impulses in the junctor address provided from the service link network control are also applied via a plurality of OR gates 1046–1053 to AND gate 1054. A bit in both the "X" and "Y" portion of the junctor address received in the junctor release control will provide for enabling of AND gate 1054 to thereby set the flip flop 1045 to provide an output indicative of the busy condition of the junctor release control circuit.

Looking now to the electromechanical portion of the junctor release control in FIG. 7B, there is provided an association with the control signal supplied by the electronic portion of the junctor release control a relay RJT for junctor release, a relay RSR for release of the SR relay in the junctor, and a relay OSR for operation of the SR relay in the junctor. In addition, there is provided control relays OTA and OTB, a control relay ST and a control relay SL. The operation of one of the relays RJT, RSR or OSR in combination with the operation of the various control relays provides tthe sequence of events which result either in release of the junctor release of the SR relay or operation of the SR relay. The following description of the operation of the electromechanical portion of the system in conjunction with junctor release will further indicate the various functions of the individual components of this circuit.

After the counter in the junctor memory 203 has reached the count which indicates that the junctor control should be attached to the supervisory processing circuit through the service link network control 110 and service link network 111 a release junctor signal REL JCT is obtained through the electronic portion of the junctor release control from the register control 206 actuating the RJT relay in the electrochemical portion of the system (FIG. 7B). The energization of the RJT relay causes energization of the relay SL thereby applying ground through the service link network to the junctor at control line S providing for connection of the junctor, release control to the junctor circuit. As soon as the SL relay is energized, ground is applied via the lines 1060, 1061, 1062 and 1063 and 1064 to energize the ST relay. Energization of the ST relay applies this same ground to the relay OPA energizing that relay which simultaneously applies ground to relay OPB energizing that relay also.

As soon as the SL relay was energized, a negative potential was applied via the resistor 1065 to the control line CO to the junctor, which signal due to its polarity will set the CO relay and reset the relay RT. This disconnects the transmission lines T and R from the transmission bridge 301 in the junctor and also disconnects the control leads T, R, S, MK and CO from the transmission lines to the called line circuit. Then upon energization of the relays ST, OPA, and OPB, a negative potential is applied to the output control lines T, R and MK so as to release the relays RB and SR in the junctor thereby disconnecting the junctor from the calling line circuit. The CO relay in the junctor is then released and the junctor control circuit is separated from the junctor thereby effecting disconnection of the entire control system from the transmission line.

The release of the junctor under conditions where the called party terminates the call first is essentially identical to the sequence described above with regard to termination of the calling party first.

ADD-ON CONFERENCE TRUNK

In accordance with the instant invention an add-on conference feature is associated with the common control system already described such that a third party may be introduced into an existing connection under the control of the flashing of the calling or called subscriber's switch hook. With this circuit, it is possible to establish a connection between originating and terminating line circuits and a third party terminating circuit by way of the add-on conference circuit or between any two of the three existing connections once the add-on conference system has acquired the third party line circuit.

As indicated with reference to FIGURE 2B, at the time that a call is being completed between originating and terminating subscribers, information regarding the class of service available to the called and calling parties is provided by the register control 206 via the number translator 105 and is stored in character E of the junctor memory 203 in association with the particular junctor establishing the connection between the subscribers. A bit in position 1 or 3 of character E of the junctor memory indicates that the calling or called parties, respectively, has the add-on conference feature, so that a flashing of the switch hook of a subscriber having the add-on conference feature in combination with an indication in the memory that the call has been established between the originating and terminating line circuits will indicate that the flashing is not dialed digits but is a request for further service. This flashing condition will be sufficient to acquire the add-on conference bridge 212 necessary for establishing a conference circuit. The indication that the call has been completed between originating and terminating line circuits is provided by a bit in the first position of character C of the junctor memory indicating that the called subscriber has answered and that the call has been established.

FIGURE 8 provides a general block diagram of the add-on conference arrangement in accordance with the instant invention. The common control circuit already described in connection with an originating call including the originating line circuit 101, line link network 102, junctor circuit 107, trunk link network 108, line link network 102, and terminating line circuit 101 along with the supervisory processing circuit 201 and junctor memory 203 and service link network 111 are connected by way of add-on conference bridge 212 to a similar common control system including line link network 902, junctor circuit 907, trunk link network 908, line link network 902 and third party terminating line circuit 901. In addition, the service equipment associated with junctor 907 includes supervisory processing circuit 801 with junctor memory 803, service link network 811 interconnecting the junctor 907 with common equipment including release control 809 and ring control 810, and also provides a register control 806 and register memory 807 associated with the service link network 811.

It should be understood that the common control systems associated with the originating and terminating line circuits and the system associated with the third party terminating line circuit in the add-on conference system are identical to the common control systems described in connection with FIGURE 2A; however, as is apparent from FIG. 8, certain circuits such as the register buffer 205, service link network control 110, and various time shared service circuits have been omitted from the figure for purposes of clarity of illustration and description of the invention. While a separate supervisory processing circuit 801 and junctor memory 803, along with service link network 811 and register control 806 with its associated circuits, are illustrated as separate and distinct from the corresponding circuits associated with the junctor 107 in the originating common control circuit, it should be apparent that since a supervisory processing circuit is associated with a plurality of junctors on a time division multiplex basis and is capable of handling a plurality of functions in association with these junctors, that the junctor 107 and junctor 907 may be associated with the same supervisory processing circuit and corresponding register controls for calls associated with a common exchange. However, for simplicity of illustration and explanation of the invention, this service equipment is illustrated in FIGURE 8 as being separate and distinct as would be the case in connection with trunk calls.

As indicated above, the segment of the junctor memory associated with a given junctor has recorded in it, at the time that the call is set up between the originating and terminating subscribers, the information that the caller or called parties have the add-on conference feature. After a call has been established as evidenced by a bit in position 1 of character C of the junctor memory, detection of a flash of the subscriber switch hook of either party, as detected by the sensors in the junctor 107, will be sufficient to effect control by the register control 206 to acquire the add-on conference bridge 212. If either of the parties have the facility for add-on conference as determined by positions 1 and 3 of character E of the junctor memory, then the appropriate side of the transmission bridge in the junctor 107 is extended metallically into the service link network to the add-on conference bridge 212 and at the same time the identity of the associated junctor is stored in the conference trunk circuit.

For purposes of explanation of the invention, it will be assumed that the party having the add-on conference feature is the terminating or called subscriber in the original transmission circuit. When the line circuit is connected metallically through the junctor 107 to the add-on conference bridge, the line link network 902 to which the conference bridge 212 is connected senses a closed line condition similar to that provided by the off-hook condition of a subscriber circuit, and a junctor 907 and dial tone applicator-out pulser circuit (not shown) are acquired in a manner similar to an originating call, as previously described. The line link network 902 is connected to the junctor 907 under control of the supervisory processing circuit 901 and register control 806 and dial tone is returned through the service link work 811, junctor 907, line link network 902, add-on conference bridge 212, service link network 111, junctor 107, trunk link network 108 and line link network 102 to the party having the add-on conference feature. This party then dials the number of the third party to be contacted through the conference circuit. During this time, the calling party of the original call is held on an open line circuit at the junctor 107 for subsequent connection to the called party and the third party in the conference circuit.

The dialed digits received via the junctor 907 in the conference circuit are applied via the supervisory processing circuit 801 to the register control 806 which, in turn, stores the dialed digits in the register memory 807 until all of the digits representative of the complete subscriber line circuit have been received. A test is then made of the condition (busy or free) of the third party line circuit, and if free, ringing is applied to this third party line circuit and ring back is applied via the add-on conference bridge 212 and junctor 107 to the party having the add-on conference feature. When the third party subscriber answers, connection is established between the third party and the party in the originating call having the add-on conference feature via the junctor 907 and 107. Actuation of this appropriate relay in the junctor 107 then serve to connect the calling party in the originating transmission circuit to both the called party and the third party via the conference circuit so that a conference call may be conducted.

The add-on conference circuit 212 includes an add-on conference bridge circuit illustrated in FIG. 9, and an electronic interface and junctor address store illustrated in FIG. 10. The add-on conference bridge in FIG. 9 includes as a primary element a transformer bridge 920 including primary windings 921 and 922 interconnected by a direct current isolation capacitor 925 to respective service lines T and R from the service link network 111. A calling bridge relay CB provides separate windings interconnecting either side of the capacitor 925 to opposite sides of a direct current source 930 in the conventional manner so that a closing of the line circuit across the leads T and R will effect actuation of the CB relay.

The transformer bridge 920 also includes a pair of secondary windings 923 and 924 interconnected by a direct current isolation capacitor 926, which windings are connected across the leads T and R to the line link network 902. An answering bridge relay AB provides separate windings interconnecting either side of the capacitor 926 with a source of direct current 931 so that interconnection of the lines T and R will effect actuation of the relay AB. The sleeve lead S from the service link network 111 is extended through the add-on conference bridge directly to the line link network 902.

A release delay relay RD is interconnected between a source of direct current potential 941 and ground with the break contact of the calling bridge relay CB and answering bridge relay AB interposed between the relay RD and ground so that actuation of either relay will effect actuation of the RD relay In turn, actuation of the RD relay will serve to place a holding ground on the sleeve lead S via rectifier 942. A shunt relay SH is provided in conjunction with the release delay relay RD and is connected between a source of direct current 940 and ground by actuation of the relay RD in conjunction with actuation of either relay CB or AB.

The add-on conference bridge circuit in accordance with the invention also provides a relay SA which is connected to the sleeve lead S for receipt of positive battery signal when the called subscriber answers, and serves to remove the battery connection from the incoming loop and to connect battery toward the line link network under these conditions. A relay DO is provided in conjunction with the relay SA which completes the connection of this relay between the direct current source and ground.

The relay DS provided in conjunction with the add-on conference bridge in FIG. 9 receives an appropriate signal from the electronic interface and junctor address store of FIG. 10 which serves to effect a release operation upon release by the third party subscriber.

The electronic interface and junctor address store associated with the add-on conference circuit of the invention, and illustrated in FIG. 10, is utilized primarily in conjunction with the release operation of the add-on conference circuit. At the time that the flash signl together with the appropriate class of service is recognized in the supervisory processing circuit 201 and the add-on conference circuit is acquired by the register control 206 for association with the service link network 111 and junctor 107, the address of the junctor 107 is applied to and stored in flip flops 820 through 827 of the add-on conference circuit In addition to the storage flip flops 820–827, the junctor address is also applied via OR gates 830–837 and AND gate 840 to a busy free flip flop 850 so as to set the flip flop indicating on the output line 821 that the add-on conference circuit 212 is not available for use in conjunction with another junctor.

At the time that the add-on conference trunk is to be released due to release of the subscriber in the original transmission having the add-on conference feature, a release trunk instruction is applied from the supervisory processor 201 to the add on conference circuit 212 along with the address of the appropriate junctor in the original transmission circuit associated with the add-on conference call. The "X" and "Y" portions of the address from the supervisory processor 201, including both the set and reset values of the address are applied to input AND gates 851 through 866. If coincidence occurs between the complete address stored in the flip flops 820–827 and the address applied from the supervisory processor 201 to the input AND gate 851–866, outputs will be provided via OR gates 870–877 to respective AND gates 878 and 879 indicating coincidence of both the "X" and "Y" portions of the address. The output from AND gates 878 and 879 are in turn applied to coincidence AND gate 880 along with the release trunk instruction from the supervisory processor 201. The output of the AND gate 880 is applied to set control flip flop 885 via diode 886.

The flip flop 885 is controlled on a timed basis whereby a synchronizing timing pulse is applied to the flip flop after the circuit has stored the release trunk instruction. A reset S and reset Z timing pulses are applied sequentially to respective input AND gates 888 and 889 from a timing pulse source (not shown) The output of the AND gates 888 and 889 are applied to set and reset, respectively, a control flip-flop 890 which in turn serves to control the condition of flip-flop 885.

With the flip flop 885 in the set condition due to application of the release trunk instruction pulse from the AND gate 880 and the flip flop 890 in the reset condition due to the previous operation of the circuit, application of a reset Z timing pulse to the AND gate 889 in conjunction with the output of hte flip flop 890 will produce an output pulse from the AND gate 889 which is applied both to the flip flop 890 and the flip flop 885 to set and reset the flip flops respectively. Resetting of the flip flop 885 produces an output to relay driver 891 in the form of a DS signal which is applied to the DS relay in the bridge circuit of FIG 9 effecting a release of the bridge circuit in a manner to be described more fully hereinafter. The reset condition of the flip flop 885 in combination with application of a reset S timing pulse to an AND gate 888 will then serve to reset the flip flop 890 to prepare the add-on conference circuit for association with another junctor circuit.

At the time that an output was provided at AND gate 889 for resetting flip flop 885, a signal was also applied to the busy free flip flop 850 to reset this flip flop indicating the free condition of the add-on conference circuit. The break contact of the BF relay which is controlled by the release delay relay RD is interposed in the line 851 from the busy free flip flop 850 to insure that a circuit free signal is not provided on the line 851 until the add-on conference circuit had been completely released.

An understanding of the principles of the add-on conference circuit of the invention can be most clearly understood from a detailed description of the operation of this circuit in conjunction with the common control circuit previously described. Looking now to FIGURE 9, the add-on conference circuit is selected by the supervisory processor 201 as soon as the flash signal together with the appropriate class of service is recognized in the supervisory processing circuit 201. A holding ground on the sleeve lead S in the junctor 107 serves to hold the relay contact in the service link network 111 to maintain connection between the junctor 107 and the add-on conference circuit 212. Under control of the register control 206 via the junctor control 211 appropriate control signals are applied to the junctor to initiate the add-on conference sequence. A positive pulse is first applied to the control line CO in the junctor to operate the CO relay thereby making possible actuation of the other relays in the junctor, and isolating the transmission loops from the service lines. During subsequent scan of the junctor, positive signals are applied to control lines T and R to operate the TK and RD relays in preparation for connecting the transmission lines T, R and S through the service link network 111 to the add-on conference circuit 212. During the next scan of the junctor the supervisory processor 201 applies a negative pulse to the control line CO via the junctor control 211 to release the relay RT thereby disconnecting the called party having the add-on conference feature from the calling party in the original transmission circuit. The original calling party is maintained on the line during subsequent operations to acquire the third party on the add-on conference circuit, being held by the actuation of the RD relay which provides a holding ground forward on the sleeve lead S to the line link network 102. During the next scan of the junctor the negative pulse previously applied to the control line CO is removed to release the relay CO thereby providing connection from the called party having add on feature through the service link network 111 to the add on conference circuit 212.

The loop extended from the junctor 107 seizes the conference trunk and causes the operation of the relay CB in FIGURE 9. The operation of relay CB closes the line T to the line link network 902 completing the loop to the line link network via a standard line circuit. The operation of the line relay in the relay circuit causes the association of a junctor 907 and dial tone applicator outpulser circuit (not shown) along with a register control 806 and appropriate time slot in the register memory 807. With the called party having the add-on conference feature in the original transmission circuit connected through the junctor 107, add-on conference circuit 212, and line link network 902 to the junctor 907, the sequence of events necessary to establish a call, as already described, are performed by the junctor circuit 907 in combination with the supervisory processing circuit 801, junctor memory 803 and register control 806 in association with appropriate segments of register memory 807 with the result that dial tone is applied through the service link network 212, service link network 111, junctor 107, trunk link network 108 and line link network 102 to the subscriber having the add on conference feature in the original transmission circuit.

The subscriber then proceeds to dial the number of the third party subscriber with the dialed impulses being applied to the bridge circuit in the add on conference circuit 212. These impulses are applied to the calling bridge relay CB which effects a repeat of the impulses through proper control of the release delay relay RD and the shunt relay SH. With each dialed impulse the relay CB is energized, closing the circuit of the release delay relay RD to ground, which in turn completes the circuit of the shunt relay SH to ground, resulting in the energization of both relays. The repeated energization of the relays RD and SH with receipt of dialed impulses provides for application of these impulses through the line link network 902 to the junctor 907 in the conventional way. The junctor 907 then operates in the same manner as described in connection with the junctor 107 for establishing the original call to detect the dialed impulses and apply them to the supervisory processing circuit for storage in the junctor memory 803. The dialed impulses are then transferred from the supervisory processing circuit 801 to the register control 806 where they are stored in the register memory 807.

Upon receipt of all of the necessary dialed impulses to complete connection with the third party subscriber, a test is made in the conventional manner to the designated third party line circuit, and if the line is free, ringing is applied from the ring control 810 through the service link network 811 and junctor 907, trunk link network 908, line link network 902 to the line circuit of the third party. At the same time, and in the same manner as previously described, ring-back is applied through the junctor 907 and add-on conference circuit 212 to the junctor 107 and subsequently to the line circuit of the party establishing the conference call.

When the called subscriber answers, a positive battery signal is returned to the add-on conference circuit 212 which causes operation of the relay SA effecting locking of this relay through completion of the circuit from the DC source 950 to ground. The relay SA removes the battery connection from the incoming loop from the service link network 111 thereby rendering the calling bridge relay CB inactive and connects battery toward the line link network 902 through activation of the answering bridge relay AB. Upon receipt of the ring trip signal in the junctor 907 as a result of the off-hook condition in the third party subscriber circuit, the switch through relay in the junctor is actuated and battery feed from the answering bridge AB in the add-on conference bridge 920 is extended through the third party line circuit. The entire switch train is now held from the ground extended forward by the RD relay in the add-on conference circuit. The control of this relay RD is now vested in the third party supervisory relay AB in the add-on conference circuit.

When the third party subscriber answers, control from the supervisory processor 201 through the junctor control 211 provides for reoperation of the relay RT in the junctor 107 through application of a negative pulse to the control line MK in the junctor 107. During the subsequent scan of the junctor 107 a positive pulse is applied to the control line CO so that the relay CO in the junctor is operated subsequent to the operation of the relay RT and connection is once again established between the original calling and called subscribers with the third party subscriber also being connected into the transmission circuit. A positive signal applied to the control line T and a negative signal applied to the control line R to the junctor 107 from the line link network 111 through the subsequent scan of the junctor will then release the relay TK therein which is no longer needed for providing a holding ground in view of the holding ground provided by the add-on conference circuit. The relay CO in the junctor 107 is then released to establish the three-way conversation.

Release of the various subscribers is carried out in conjunction with the junctors associated with the individual subscriber circuits. For example, in the case where the third party of the conference circuit releases first, then the relay AB in the add-on conference bridge releases the relay RD and the add-on conference circuit releases from the original transmission circuit. In such case, the normal two-way conversation from the original calling to the original called party is maintained.

On the other hand, if both the original calling and called subscribers release before the third party subscriber, the junctor 107 will be released in accordance with the sequence described above in connection with the circuits of the FIGS. 7A and 7B. At the same time, the supervisory processor 201 will generate a release signal which will be applied along with the address of the releasing junctor 107 to each of the add-on conference circuits until coincidence occurs in the junctor address store of an add-on conference circuit as described in connection with FIG. 10. Coincidence between the junctor address stored in the circuit and that applied from the supervisory processor 201 in combination with a release trunk instruction will produce an output from AND gate 880 to set flip flop 885. Subsequent application of a reset pulse Z to the AND gate 889 will reset the flip flop 885 generating a control signal DS to the relay driver 891 which is applied to the relay DS in the bridge circuit of FIG. 9. Actuation of the relay DS releases the relay SA thereby releasing the answering bridge relay AB, which in turn releases the release delay relay RD removing the holding ground from the sleeve lead S.

A delay is provided in the release of the relay SA by the relay DO and the shunt relay SH until the relay DS is operated to the subsequent scanning cycle, which prevents the reconnection of the battery feed to the original junctor 107.

A third type of release condition includes release by one or the other of the original subscribers, for example, the called subscriber having the add-on conference feature without release by the other subscriber, the original calling subscriber, or the third party subscriber. Under such conditions, upon detection of the open called line circuit in the junctor 107, the supervisory processor 201 and the add-on buffer in the conference circuit is requested and acquired thereby. Subsequent operation of the relay CO and release of the relays RT and SR disconnect the called subscriber from the junctor 107 so that upon subsequent release of the relay CO the calling subscriber is once again connected to the third party via the conference circuit.

A fourth type of release condition is implemented by the supervisory processor 201 when either of the original parties, which has the add-on class of service, flashes his switchhook after a conference connection has been established to a third party. Under these circumstances, the flashing condition detected by the supervisory processor 201 in conjunction with recognition of the class of service and existing conference connection, effects generation of a release signal by the supervisory processor 201, which is applied along with the address of the releasing junctor 107 to each of the add-on conference circuits until coincidence occurs in the junctor address store of an add-on conference circuit as described in connection with FIG. 10. The third party is thus released and dial tone is returned to the flashing party while the junctor 107 holds the other original party. The subscriber receiving dial tone may then dial though to another third party subscriber or by dialing a special code will be restored to the original connection with the other original party.

The add-on conference circuit of the instant invention is associated with the same signal control as a number of junctors and more than one such circuit may be used in the same group if the traffic dictates such. The add-on conference circuit connects to a regular line circuit in any convenient line group and seizure of this add-on conference circuit causes the line circuit to be seized and hence a junctor and register could be associated therewith. The class of service of the line is such as not to permit the addition of further parties via the new junctor circuit in the add-on conference circuit so that only three parties are available for conference connection. The circuits are so arranged that either the three parties or any two of them may remain in the connection as indicated above with regard to the release conditions.

The conference arrangement of the present invention may also include an abbreviated dialing feature, such as included in the system illustrated in FIG. 11. These conference calls can be established by subscribers with the proper class of service by dialing the abbreviated code for the particular third party subscriber; the remaining functions necessary to complete the conference call are then effected automatically by the telephone equipment.

Referring now to FIGURE 11, as in the previously described embodiment of the present invention, flashing of the hook switch by the subscriber having the add-on conference feature as well as an abbreviated dialing feature, as recorded in the junctor memory 203, serves as a signal to the supervisory processing circuit to check the memory for the calling party's class of service and results in application to the supervisory processor 201 of a request for connection of the add-on conference circuit 212 to the service link network 111.

As indicated in connection with the previous embodiment, the supervisory processor 201 also effects a splitting of the junctor 107 so as to connect the line circuit initiating the add-on conference request metallically through the junctor 107 and the service link network 111 to the add-on conference circuit 212, while effecting a holding of the other original subscriber. At this point, the line link network control 945, which periodically scans the line circuits 901 associated therewith, senses a line circuit having a special class of service and a closed loop condition similar to that provided by the off hook condition of a subscriber circuit, whereupon the line link network control 945 marks the line circuit 901 and signals the register control 806 to request a junctor 907 and dial tone applicator and outpulser circuit 808 in a manner similar to an originating call, as previously described.

Connection is then effected between the line circuit 901 and line link network 902 and between the line link network 902 and the junctor 907, and dial tone is applied back through the service link network 811, junctor 907, line link network 902, line circuit 901, add on circuit 212, service link network 111, junctor 107 and line link network 102 to the party initiating the request for add on conference service. This party then dials an abbreviated number of the third party to be contacted through the conference circuit and the dialed digits are sensed at the junctor 907 and applied to the register control 806.

Receipt of an abbreviated number in the register control 806 along with recognition of the class of service of the party initiating the request for conference service including abbreviated dialing, effects a seizure of an identifier 950 by the register control 806 to identify the calling equipment number, which is needed to complete the call. The identifier 950 may take the form of any well known telephone number identifying device of which many arrangements of conventional configuration are known in the telephone art. This circuit provides means of identifying the equipment number of subscribers having the add on conference feature with abbreviated dialing, so that application of a translator provides the full call number of the third party line circuit requested by the calling subscriber. This number is applied to the register control 806, which then effects a connection of the junctor 907 through the line link network 902 to the appropriate third party line circuit.

Thus, with the proper class of service and means for storing each line circuit having this proper class of service, a plurality of call numbers which may be identified by abbreviated numbers, the completion of a call from an original party through an add-on conference circuit to a third conference party may be effected in a simplified and automatic manner.

While we have shown and described several embodiments in accordance with the instant invention, it is understood that the same is not limited thereto but is susceptible of numerous changes and modifications as known to a person skilled in the art, and we therefore do not wish to be limited to the details shown and described therein but intend to cover all such changes and modifications as are encompassed by the scope of the appended claims.

We claim:

1. In combination, in a time division multiplex telephone system, first and second supervisory control systems each including a programmed junctor means for interconnecting calling and called subscriber line circuits with common supervisory equipment on a time share basis for sensing the condition of said line circuits and effecting control thereover in response to said supervisory equipment, said supervisory equipment including a service link network for connecting control circuits to said junctor means and register control means for controlling said service link network and control circuits in response to line conditions detected by said junctor means, an add-on conference control circuit associated with said first supervisory control system by said register control means in response to detection of a flashing line condition in a called subscriber line circuit connected to said first supervisory control system comprising, a transformer bridge having a primary and secondary winding and calling bridge relay means connected to said primary winding and actuated in response to connection of said primary winding to said service link network in said first supervisory control system for connecting said secondary winding to said second supervisory control system, thereby to establish connection between one subscriber line circuit connected to said first supervisory control system and said second supervisory control system as means to establish connection to a third party called subscriber.

2. The combination defined in claim 1 further including a supervisory control line connected to the service link network in said first suprvisory control system, and release delay means actuated by said calling bridge relay means for applying a holding ground to said supervisory control line.

3. The combination defined in claim 2 further including shunt relay means shunting said secondary winding of said transformer bridge in response to actuation of said release delay relay means for repeating dialing impulses received at the primary winding of said transformer bridge from said one subscriber line circuit via said first supervisory control system for application to said second supervisory control system for processing.

4. The combination defined in claim 3 further including an answering bridge relay means connected to the secondary winding of said transformer bridge, a supervisory control line connected to said junctor means in said second supervisory control system, and control relay means connected to said supervisory control line to said junctor means and actuated in response to closing of the third party subscriber line circuit to said calling bridge relay means and actuating said answering bridge relay means, said release delay relay means also being actuated by said answering bridge relay means.

5. The combination defined in claim 4 wherein said junctor means in said first supervisory control system is capable of connecting both a calling and a called subscriber line circuit through said transformer bridge to a third party subscriber line circuit via a junctor means in said second supervisory control system.

6. The combination as defined in claim 5 wherein said conference control circuit further includes storage means for storing binary signals representing the address of a junctor means in said first supervisory control system, comparison means for generating a release signal in response to correspondence between address signals received from said register control means and the address stored in said storage means, and release relay means for releasing said release delay means in response to said release signal.

7. The combination as defined in claim 6 further including delay means for delaying the generation of said release signal by a predetermined time after correspondence between said addesses is detected.

8. An add-on conference control circuit for use in connection with time division multiplex telephone systems having first and second supervisory control systems for interconnecting calling and called subscriber line circuits, comprising transformer bridge means, including primary and secondary coupled windings, said primary winding being connectable to said first supervisory control system, calling bridge relay means connected to said primary winding and actuated in response to connection to said first supervisory control system for connecting said secondary winding to said second supervisory control system to thereby interconnect said first and second supervisory control systems providing means for establishing a connection between calling and called subscriber line circuits connected to said first supervisory control system and a third party circuit connected to said second supervisory control system, wherein said first and second supervisory control means each include a service link network for connecting selective control circuits to said subscriber line circuits and register means for controlling said service link network and the control circuits associated therewith in response to detected line conditions, and means for isolating one of said calling and called subscriber line circuits while connecting the other subscriber line circuit to said transformer bridge means.

9. The combination defined in claim 8 further including a supervisory control line connected to the service link network in said first supervisory control system, and release delay means actuated by said calling bridge relay means for applying a holding ground to said supervisory control line.

10. The combination defined in claim 9 further including shunt relay means shunting said secondary winding of said transformer bridge in response to actuation of said release delay relay means for repeating dialing impulses received at the primary winding of said transformer bridge from said one subscriber line circuit via said first supervisory control system for application to said second supervisory control system for processing.

11. The combination defined in claim 10 further including an answering bridge relay means connected to the secondary winding of said transformer bridge, a supervisory control line connected to said junctor means in said second supervisory control system, and control relay means connected to said supervisory control line to said junctor means and actuated in response to closing of the third party subscriber line circuit to said calling bridge relay means and actuating said answering bridge relay means, said release delay means also being actuated by said answering bridge relay means.

12. The combination defined in claim 8 further including number identifier means for identifying equipment numbers of line circuits in connection with subscriber line circuits, said register means being connected to said identifier means for receiving an equipment number therefrom in response to an abbreviated call number and translator means for receiving therefrom the full call number corresponding thereto.

13. In combination with a time division multiplex telephone system including first and second supervisory control systems each including a programmed junctor means for interconnecting calling and called subscriber line circuits with common supervisory equipment on a time share basis for sensing the condition of said line circuits and effecting control thereover in response to said supervisory equipment, said supervisory equipment including a service link network for connecting control circuits to said junctor means and supervisory control means for controlling said service link network and control circuits in response to line conditions detected by said junctor means, an add-on conference control circuit associated with said first supervisory control system by said supervisory control means in response to detection of a flahing line condition in a called subscriber line circuit connected to said first supervisory control system including a transformer bridge having a primary and secondary winding and calling bridge relay means connected to said primary winding and actuated in response to connection of said primary winding to said service link network in said first supervisory control system for connecting said secondary winding to said second supervisory control system to establish connection between one subscriber line circuit connected to said first supervisory control system and said second supervisory control system as means to establish connection to a third party called subscriber, and number identifier means for translating a first signal representing an abbreviated dialed number of a third party called subscriber derived in said first supervisory control system into a second signal representing a full call number, and means for applying said second signal to said second supervisory control system.

14. The combination defined in claim 13 wherein said number identifier means is connected to selective line circuits and to said register control means in said second supervisory control system for receiving said first signal from an applying said second signal to said register control means in response to stored data designated by a selective third party subscriber line circuit.

15. In a time division multiplex telephone system having a supervisory control system for supervising and controlling the interconnection of calling and called subscriber line circuits in a selected time slot of a repetitive time frame including a service link network for connecting selective control circuits to said subscriber line circuits and register means for controlling said service link network and the control circuits associated therewith in response to detected line conditions, an add-on conference control circuit, comprising transformer bridge means including primary and secondary coupled windings, said primary winding being connectable to said supervisory control system during a first time slot of said repetitive time frame in response to a detected condition of a line between calling and called subscriber line circuits in said first time slot, calling bridge relay means connected to said primary winding and actuated in response to connection to said supervisory control system for connecting said secondary winding to said supervisory control system in a second time slot of said repetitive time frame to establish a connection between said calling and called subscriber line circuits and a third party circuit.

References Cited

UNITED STATES PATENTS

| | | | |
|---|---|---|---|
| 2,949,506 | 8/1960 | Abbott et al | 179—18 |
| 3,320,367 | 5/1967 | Krom | 179—18 |
| 3,377,433 | 4/1968 | Whitney | 179—18 |

KATHLEEN H. CLAFFY, Primary Examiner

W. A. HELVESTINE, Assistant Examiner